(12) United States Patent
Yasuda et al.

(10) Patent No.: US 9,203,091 B2
(45) Date of Patent: Dec. 1, 2015

(54) SLURRY FOR SECONDARY BATTERY NEGATIVE ELECTRODES, SECONDARY BATTERY NEGATIVE ELECTRODE AND MANUFACTURING METHOD THEREOF, AND SECONDARY BATTERY

(75) Inventors: Naohiro Yasuda, Tokyo (JP); Tomokazu Sasaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 303 days.

(21) Appl. No.: 13/985,075

(22) PCT Filed: Feb. 10, 2012

(86) PCT No.: PCT/JP2012/053149
§ 371 (c)(1),
(2), (4) Date: Aug. 13, 2013

(87) PCT Pub. No.: WO2012/111564
PCT Pub. Date: Aug. 23, 2012

(65) Prior Publication Data
US 2013/0316235 A1 Nov. 28, 2013

(30) Foreign Application Priority Data
Feb. 14, 2011 (JP) ................................. 2011-028677

(51) Int. Cl.
| | | |
|---|---|---|
| H01M 4/04 | (2006.01) | |
| H01M 4/60 | (2006.01) | |
| H01M 4/02 | (2006.01) | |
| H01M 4/13 | (2010.01) | |
| H01M 4/139 | (2010.01) | |
| H01M 4/62 | (2006.01) | |
| C08L 31/02 | (2006.01) | |
| C08L 33/02 | (2006.01) | |
| C08L 35/02 | (2006.01) | |
| C08L 47/00 | (2006.01) | |

(52) U.S. Cl.
CPC ................ *H01M 4/604* (2013.01); *H01M 4/02* (2013.01); *H01M 4/04* (2013.01); *H01M 4/0404* (2013.01); *H01M 4/13* (2013.01); *H01M 4/139* (2013.01); *H01M 4/62* (2013.01); *C08L 31/02* (2013.01); *C08L 33/02* (2013.01); *C08L 35/02* (2013.01); *C08L 47/00* (2013.01); *Y02E 60/122* (2013.01)

(58) Field of Classification Search
CPC ....... H01M 4/02; H01M 4/04; H01M 4/0404; H01M 4/13; H01M 4/62; H01M 4/139; H01M 4/604; C08L 47/00; C08L 31/02; C08L 35/02; C08L 33/02; Y02E 60/122
See application file for complete search history.

(56) References Cited

U.S. PATENT DOCUMENTS

2011/0171526 A1* 7/2011 Wakizaka et al. ............. 429/217

FOREIGN PATENT DOCUMENTS

| | | | |
|---|---|---|---|
| CN | 101156264 | A | 4/2008 |
| CN | 101379651 | A | 3/2009 |
| JP | 2003-308841 | A | 10/2003 |
| JP | 2005-190747 | A | 7/2005 |
| JP | 2009-004222 | * | 1/2009 |
| JP | 2009-4222 | A | 1/2009 |
| JP | 2009-123523 | * | 6/2009 |
| JP | 2009-123523 | A | 6/2009 |
| JP | 2010-189632 | A | 9/2010 |
| WO | WO 2006/107173 | A1 | 10/2006 |
| WO | WO2010/032784 | * | 3/2010 |

OTHER PUBLICATIONS

International Search Report, mailed Apr. 24, 2012, issued in PCT/JP2012/053149.
Chinese Office Action and Search Report, issued Feb. 4, 2015, for Chinese Application No. 201280007447.0.

* cited by examiner

*Primary Examiner* — Robert Jones, Jr.
(74) *Attorney, Agent, or Firm* — Birch, Stewart, Kolasch & Birch, LLP

(57) ABSTRACT

A composition containing an electrode active material, a water-insoluble polymer (A), and a water-soluble polymer (B), wherein: the water-insoluble polymer (A) contains 20 wt % to 60 wt % of an aliphatic conjugated diene monomer unit (a1), 0.5 wt % to 10 wt % of an ethylenically unsaturated carboxylic acid monomer unit (a2), and 30 wt % to 79.5 wt % of a unit (a3) of a monomer that is copolymerizable therewith; the water-soluble polymer (B) contains 20 wt % to 60 wt % of an ethylenically unsaturated carboxylic acid monomer unit (b1), 25 wt % to 78 wt % of a (meth)acrylic acid ester monomer unit (b2), and 2 wt % to 15 wt % of a unit (b3) of a sulfonic acid group-containing monomer that is copolymerizable therewith; and a ratio (A)/(B) of the water-insoluble polymer (A) relative to the water-soluble polymer (B) is 80/20 to 95/5.

8 Claims, 1 Drawing Sheet

SLURRY FOR SECONDARY BATTERY NEGATIVE ELECTRODES, SECONDARY BATTERY NEGATIVE ELECTRODE AND MANUFACTURING METHOD THEREOF, AND SECONDARY BATTERY

FIELD

The present invention relates to a slurry for a negative electrode of a secondary battery, a negative electrode for a secondary battery, a method for producing the same, and a secondary battery.

BACKGROUND

In recent years, handheld terminal devices such as laptop computers, cellular phones and PDA (personal digital assistant) are being remarkably spread. As a secondary battery used as a power source for these handheld terminal devices, e.g., a nickel-metal hydride secondary battery and a lithium ion secondary battery are often used. The handheld terminal devices are required to have a comfortable portability, and therefore such devices are rapidly becoming more compact, thin and lightweight with better performance. As a result, the handheld terminal devices are now being used in a wide variety of situations. Like the handheld terminal devices, the secondary battery is also required to be more compact, thin and lightweight with better performance.

For improving the performance of the secondary battery, there have been studied modification of the electrode, the electrolytic solution, and other members of the battery. Among them, the electrode is usually produced by mixing an electrode active material and, if necessary, a conducting agent such as electroconductive carbon, with a binder composition in which a polymer serving as a binder is dispersed or dissolved in a solvent such as water or an organic liquid to prepare a slurry, then applying the slurry onto a collector, and drying the slurry. As to electrodes, in addition to the studies on the electrode active material and the collector themselves, there have also been made studies on the polymer serving as the binder for effecting binding of, e.g., the electrode active material to the collector. For example, Patent Literatures 1 and 2 describe techniques about binders for secondary batteries.

CITATION LIST

Patent Literature

Patent Literature 1: Japanese Patent Application Laid-Open No. 2005-190747 A
Patent Literature 2: Japanese Patent Application Laid-Open No. 2003-308841A

SUMMARY

Technical Problem

However, according to studies by the present inventors, dispersion of the electrode active material in the electrodes produced by the production method described in Patent Literatures 1 and 2 is insufficient, and there are insufficiencies in adhesion property of the electrode active material layer with the collector, and the high-temperature storage property and low-temperature output property of the secondary batteries.

The present invention has been made in view of the aforementioned problems. It is an object of the present invention to provide a slurry for a negative electrode of a secondary battery, a negative electrode for a secondary battery, a method for producing the same which achieve good adhesion property of an electrode active material layer with a collector, and good high-temperature storage property and low-temperature output property of a secondary battery. It is another object of the present invention to provide a secondary battery using them.

Solution to Problem

The inventors have intensively studied to solve the problems. As a result, the inventors have found out that a slurry for a negative electrode of a secondary battery containing a combination of an electrode active material, a water-insoluble polymer (A), and a water-soluble polymer having a sulfonic acid group (B) can improve dispersion stability of the slurry for a negative electrode of a secondary battery, that a negative electrode produced using the slurry for a negative electrode of a secondary battery has excellent adhesion property of an electrode active material layer with a collector, and that a secondary battery with the negative electrode can have remarkably improved high-temperature storage property and low-temperature output property. Thus, the present invention has been completed.

Accordingly, the present invention provides the following (1) to (8).

(1) A slurry for a negative electrode of a secondary battery, comprising an electrode active material, a water-insoluble polymer (A), and a water-soluble polymer (B), wherein:

the water-insoluble polymer (A) contains 20 wt % to 60 wt % of an aliphatic conjugated diene monomer unit (a1), 0.5 wt % to 10 wt % of an ethylenically unsaturated carboxylic acid monomer unit (a2), and 30 wt % to 79.5 wt % of a unit (a3) of a monomer that is copolymerizable with the aliphatic conjugated diene monomer and the ethylenically unsaturated carboxylic acid monomer, the water-soluble polymer (B) contains 20 wt % to 60 wt % of an ethylenically unsaturated carboxylic acid monomer unit (b1), 25 wt % to 78 wt % of a (meth)acrylic acid ester monomer unit (b2), and 2 wt % to 15 wt % of a unit (b3) of a sulfonic acid group-containing monomer that is copolymerizable with the ethylenically unsaturated carboxylic acid monomer and the (meth)acrylic acid ester monomer, and a ratio (A)/(B) in parts by weight of the water-insoluble polymer (A) relative to the water-soluble polymer (B) is 80/20 to 95/5.

(2) The slurry for a negative electrode of a secondary battery according to (1), wherein the (b3) component of the water-soluble polymer (B) is a repeating unit obtained by polymerization of one or more of sulfonic acid group-containing monomers selected from the group consisting of a sulfonic acid group-containing monomer or a salt thereof having no functional group other than a sulfonic acid group, a monomer containing an amido group and a sulfonic acid group or a salt thereof, and a monomer containing a hydroxyl group and a sulfonic acid group or a salt thereof.

(3) The slurry for a negative electrode of a secondary battery according to (1) or (2), wherein an amount of the water-insoluble polymer (A) is 0.3 parts by weight to 8 parts by weight relative to 100 parts by weight of the electrode active material.

(4) The slurry for a negative electrode of a secondary battery according to any one of (1) to (3), wherein an amount of the water-soluble polymer (B) is 0.01 parts by weight to 5 parts by weight relative to 100 parts by weight of the electrode active material.

(5) The slurry for a negative electrode of a secondary battery according to any one of (1) to (4), wherein the water-soluble polymer (B) has a weight average molecular weight of 1,000 to 100,000.

(6) A method for producing a negative electrode for a secondary battery, comprising applying onto a surface of a collector the slurry for a negative electrode of a secondary battery according to any one of (1) to (5), and drying the slurry.

(7) A negative electrode for a secondary battery, comprising a collector and an electrode active material layer formed on a surface of the collector, wherein:

the electrode active material layer contains an electrode active material, a water-insoluble polymer (A), and a water-soluble polymer (B), the water-insoluble polymer (A) contains 20 wt % to 60 wt % of an aliphatic conjugated diene monomer unit (a1), 0.5 wt % to 10 wt % of an ethylenically unsaturated carboxylic acid monomer unit (a2), and 30 wt % to 79.5 wt % of a unit (a3) of a monomer that is copolymerizable with the aliphatic conjugated diene monomer and the ethylenically unsaturated carboxylic acid monomer, the water-soluble polymer (B) contains 20 wt % to 60 wt % of an ethylenically unsaturated carboxylic acid monomer unit (b1), 25 wt % to 78 wt % of a (meth)acrylic acid ester monomer unit (b2), and 2 wt % to 15 wt % of a unit (b3) of a sulfonic acid group-containing monomer that is copolymerizable with the ethylenically unsaturated carboxylic acid monomer and the (meth)acrylic acid ester monomer, and a ratio (A)/(B) in parts by weight of the water-insoluble polymer (A) relative to the water-soluble polymer (B) is 80/20 to 95/5.

(8) A secondary battery comprising the negative electrode for a secondary battery according to (7).

Advantageous Effects of Invention

According to the slurry for a negative electrode of a secondary battery, the negative electrode for a secondary battery, and the secondary battery of the present invention, it is possible to realize a secondary battery having good adhesion property of an electrode active material layer with a collector in a negative electrode, as well as good high-temperature storage property and low-temperature output property.

According to the method for producing a negative electrode for a secondary battery of the present invention, it is possible to produce a negative electrode for a secondary battery that can realize a secondary battery having good adhesion property of an electrode active material layer with a collector in a negative electrode, as well as good high-temperature storage property and low-temperature output property.

BRIEF DESCRIPTION OF DRAWINGS

FIG. 1 is a view schematically showing an appearance of a flexibility test for a negative electrode.

DESCRIPTION OF EMBODIMENTS

The present invention will be described hereinbelow in detail by way of embodiments and exemplifications. However, the present invention is not limited to the following embodiments and exemplifications, and may be embodied with arbitrary modifications without departing from the scope of claims of the present invention and its equivalents. In the present description, "(meth)acryl-" means "acryl-" or "methacryl-". Further, a "positive electrode active material" means an electrode active material for a positive electrode, and a "negative electrode active material" means an electrode active material for a negative electrode. Further, a "positive electrode active material layer" means an electrode active material layer provided in a positive electrode, and a "negative electrode active material layer" means an electrode active material layer provided in a negative electrode.

[1. Slurry for Negative Electrode of Secondary Battery]

The slurry for a negative electrode of a secondary battery of the present invention (appropriately referred to hereinbelow as "slurry for a negative electrode of the present invention") contains an electrode active material (in this case, negative electrode active material), a water-insoluble polymer (A), and a water-soluble polymer (B). The slurry for a negative electrode of the present invention usually contains a solvent. If necessary, the slurry may also contain another optional component. In the slurry for a negative electrode of the present invention, a part of the water-soluble polymer (B) is usually dissolved in a solvent. However, another part of the water-soluble polymer (B) is usually adsorbed on the surface of the negative electrode active material, and as a result, the negative electrode active material is coated with a stable layer of the water-soluble polymer (B) to improve the dispersibility of the negative electrode active material in the solvent.

That a polymer is "water-soluble" means that when 0.5 g of the polymer is dissolved in 100 g of water at 25° C., the insoluble content is less than 0.5 wt %. On the other hand, that a polymer is water-insoluble means that when 0.5 g of the polymer is dissolved in 100 g of water at 25° C., the insoluble content is 90 wt % or more.

[1-1. Electrode Active Material]

The electrode active material (that is, negative electrode active material) contained in the slurry for a negative electrode of the present invention is a substance that donates or accepts an electron in a negative electrode of a secondary battery.

For example, when the secondary battery of the present invention is a lithium ion secondary battery, examples of the negative electrode active material may include an alloy active material and a carbon active material.

The alloy active material means an active material that contains an element capable of intercalating lithium in the structure and has a theoretical electronic capacitance per weight of 500 mAh/g or more when lithium is intercalated. The upper limit of the theoretical electronic capacitance is not particularly limited, and may be, e.g., 5,000 mAh/g or less.

Examples of the alloy active material for use may include lithium metal, elemental metal capable of forming a lithium alloy, an alloy thereof, and an oxide, a sulfide, a nitride, a silicide, a carbide, and a phosphide thereof.

Examples of the elemental metal capable of forming a lithium alloy may include elemental metals such as Ag, Al, Ba, Bi, Cu, Ga, Ge, In, Ni, P, Pb, Sb, Si, Sn, Sr, and Zn. Examples of the alloy of elemental metal capable of forming a lithium alloy may include compounds containing the aforementioned elemental metals. Among them, the elemental metals such as silicon (Si), tin (Sn), and lead (Pb), the alloys containing the elemental metals, and the compound containing the metals are preferable.

Further, the alloy active material may contain one or more non-metallic elements. Examples thereof may include SiC, $SiO_xC_y$ ($0<x\leq 3$, $0<y\leq 55$), $Si_3N_4$, $Si_2N_2O$, $SiO_x$ ($0<x\leq 2$), $SnO_x$ ($0<x\leq 2$), LiSiO, and LiSnO. Among them, $SiO_x$, SiC, and $SiO_xC_y$, in which lithium can be intercalated or deintercalated at a low electronic potential, are preferable. For example, $SiO_xC_y$ may be obtained by calcination of a polymer material containing silicon. Particularly, $SiO_xC_y$ in a range of $0.8 \leq x \leq 3$ and $2 \leq y \leq 4$ is preferably used in view of the balance between capacity and cycle property.

Examples of the oxide, the sulfide, the nitride, the silicide, the carbide and the phosphide of lithium metal, elemental metal capable of forming a lithium alloy and an alloy thereof may include an oxide, a sulfide, a nitride, a silicide, a carbide, and a phosphide of the element capable of intercalating lithium. Among them, an oxide is particularly preferable. For example, a lithium-containing metal complex oxide containing an oxide such as tin oxide, manganese oxide, titanium oxide, niobium oxide, and vanadium oxide, and a metal element selected from the group consisting of Si, Sn, Pb, and Ti elements is used.

Examples of the lithium-containing metal complex oxide may include a lithium-titanium complex oxide and a lithium-manganese complex oxide represented by $Li_xTi_yM_zO_4$ and $Li_xMn_yM_zO_4$ (wherein $0.7 \leq x \leq 1.5$, $1.5 \leq y \leq 2.3$, and $0 \leq z \leq 1.6$, and M represents an element selected from the group consisting of Na, K, Co, Al, Fe, Ti, Mg, Cr, Ga, Cu, Zn, and Nb). Among them, $Li_{4/3}Ti_{5/3}O_4$, $Li_1Ti_2O_4$, $Li_{4/5}Ti_{11/5}O_4$, or $Li_{4/3}Mn_{5/3}O_4$ is used.

Among them, as the alloy active material, a material containing silicon is preferable. In particular, $SiO_x$, SiC, and $SiO_xC_y$ are more preferable. In the material containing silicon, Li is assumed to be intercalated into or deintercalated from Si (silicon) at a high electronic potential, and into or from C (carbon) at a low electronic potential. Therefore, swelling and shrinkage are suppressed as compared with another alloy active material. Accordingly, the charging/discharging cycle property of the secondary battery are improved.

The carbon active material means an active material having carbon main skeleton that is capable of intercalating lithium, and examples thereof may include a carbonaceous material and a graphite material.

The carbonaceous material is generally a carbon material having a low degree of graphitization (low crystallinity) that is formed by heat treating (carbonizing) a carbon precursor at 2,000° C. or lower. The lower limit of the heat treatment temperature is not particularly limited, and may be, e.g., 500° C. or higher.

Examples of the carbonaceous material may include graphitizable carbon whose carbon structure easily varies depending on the heat treatment temperature and non-graphitizable carbon having a structure close to an amorphous structure that is typified by glassy carbon.

Examples of the graphitizable carbon may include a carbon material that is produced with a raw material that is tar pitch obtained from petroleum or coal. Specific examples thereof may include cokes, meso-carbon microbeads (MCMB), mesophase pitch carbon fibers, and pyrolytic vapor-grown carbon fibers. MCMBs are carbon fine particles obtained by separating and extracting mesophase spherules that have been formed in the course of overheating pitch materials at about 400° C. The mesophase pitch carbon fibers are carbon fibers produced with a raw material mesophase pitch that has been obtained by growth and coalescence of the mesophase spherules. The pyrolytic vapor-grown carbon fibers are carbon fibers obtained by (1) a method of thermally decomposing acrylic polymer fibers, (2) a method of spinning and then thermally decomposing pitches, or (3) a catalytic vapor-phase growth (catalytic CVD) method in which hydrocarbon is thermally decomposed in a vapor phase using a catalyst that is nanoparticles of, e.g., iron.

Examples of the non-graphitizable carbon may include a calcined product of phenolic resin, polyacrylonitrile carbon fibers, quasi-isotropic carbon, a calcined product of furfuryl alcohol resin (PFA), and hard carbon.

The graphite material is a graphite material that is obtained by heat-treating graphitizable carbon at 2,000° C. or higher and has a high crystallinity that is close to the crystallinity of graphite. The upper limit of the heat treatment temperature is not particularly limited, and may be, e.g., 5,000° C. or lower.

Examples of the graphite material may include natural graphite and artificial graphite. Typical examples of the artificial graphite may include artificial graphite obtained by heat treatment at 2,800° C. or higher, graphitized MCMB obtained by heat treatment of MCMB at 2,000° C. or higher, and graphitized mesophase pitch carbon fibers obtained by heat treatment of mesophase pitch carbon fibers at 2,000° C. or higher.

Among the carbon active materials, a carbonaceous material is preferable. When the carbonaceous material is used, the resistance of an electrochemical element can be reduced, and a secondary battery having excellent input and output property can be produced.

As the negative electrode active material, one species thereof may be solely used, or two or more species thereof may be used in combination at any ratio.

It is preferable that the negative electrode active material is in a form of granular particles. When the particles have a spherical shape, an electrode having a higher density can be formed in the formation of the electrode.

The volume average particle diameter of particles of the negative electrode active material is appropriately set in view of the balance between other components of the battery, and is usually 0.1 μm or more, preferably 1 μm or more, and more preferably 5 μm or more, and usually 100 μm or less, preferably 50 μm or less, and more preferably 20 μm or less.

From the viewpoints of improvement of battery properties such as initial efficiency, load property, and cycle property, the 50% volume cumulative particle diameter of particles of the negative electrode active material is usually 1 μm or more, and preferably 15 μm or more, and usually 50 μm or less, and more preferably 30 μm or less. The 50% volume cumulative particle diameter may be calculated as a particle diameter at which the accumulated volume calculated in a particle diameter distribution measured by the laser diffraction method from a small particle diameter side is 50%.

The tap density of the negative electrode active material is not particularly limited. A material having tap density of 0.6 g/cm³ or more may be suitably used.

[1-2. Water-Insoluble Polymer (A)]

The water-insoluble polymer (A) in the present invention contains an aliphatic conjugated diene monomer unit (a1), an ethylenically unsaturated carboxylic acid monomer unit (a2), and a unit (a3) of a monomer that is copolymerizable with the aliphatic conjugated diene monomer and the ethylenically unsaturated carboxylic acid monomer (this unit may simply be referred to hereinbelow as "(a3) unit").

The combination of these monomer units as the content is considered to be one of factors that brings about the effects of the present invention. According to the studies by the present inventors, it is assumed that the effects are obtained by the following mechanism. The aliphatic conjugated diene monomer unit (a1) has a low rigidity and is flexible. Further, the ethylenically unsaturated carboxylic acid monomer unit (a2) contains a carboxyl group (—COOH) that enhances the absorption to a negative electrode active material and a collector, and has a high strength. Moreover, use of the (a3) unit reduces the solubility of the water-insoluble polymer (A) in an electrolytic solution due to the aliphatic conjugated diene monomer unit (a1) and the ethylenically unsaturated carboxylic acid monomer unit (a2), to stabilize the negative electrode active material layer. It is assumed that the water-insoluble polymer (A) in the present invention is a component that acts as an excellent binder to hold the negative electrode active material on the surface of the collector in the negative electrode so as to exhibit sufficient adhesive property by the combination of the monomer units, and therefore has a function for maintaining the strength of the negative electrode active material layer.

The aliphatic conjugated diene monomer unit (a1) is a repeating unit obtained by polymerization of an aliphatic conjugated diene monomer.

Examples of the aliphatic conjugated diene monomer may include 1,3-butadiene, 2-methyl-1,3-butadiene, 2,3-dimethyl-1,3-butadiene, 2-chloro-1,3-butadiene, substituted straight-chain conjugated pentadienes, and substituted branched-chain conjugated hexadienes. Among them, 1,3-butadiene is preferable. As the aliphatic conjugated diene monomer, one species thereof may be solely used, or two or more species thereof may be used in combination at any ratio. Therefore, the water-insoluble polymer (A) in the present invention may contain solely one species of the aliphatic conjugated diene monomer unit (a1), or two or more species thereof in combination at any ratio.

In the water-insoluble polymer (A) in the present invention, the ratio of the aliphatic conjugated diene monomer unit (a1) is usually 20 wt % or more, and preferably 30 wt % or more, and usually 60 wt % or less, and preferably 55 wt % or less. When the ratio of the aliphatic conjugated diene monomer unit (a1) is set to be equal to or more than the lower limit of the range, sufficient adhesion property of the negative electrode active material layer with the collector can be obtained in application of the slurry for a negative electrode of the present invention onto the collector. When it is set to be equal to or less than the upper limit, the resistance of the negative electrode of the present invention to the electrolytic solution can be enhanced.

The ethylenically unsaturated carboxylic acid monomer unit (a2) is a repeating unit obtained by polymerization of an ethylenically unsaturated carboxylic acid monomer.

Examples of the ethylenically unsaturated carboxylic acid monomer may include monocarboxylic acid and dicarboxylic acid such as acrylic acid, methacrylic acid, crotonic acid, maleic acid, fumaric acid, and itaconic acid, and anhydrides thereof. Among them, monomers selected from the group consisting of acrylic acid, methacrylic acid, and itaconic acid are preferably used alone or in combination from the viewpoint of stability of the slurry for a negative electrode of the present invention. As the ethylenically unsaturated carboxylic acid monomer, one species thereof may be solely used, or two or more species thereof may be used in combination at any ratio. Therefore, the water-insoluble polymer (A) in the present invention may contain solely one species of the ethylenically unsaturated carboxylic acid monomer units (a2), or two or more species thereof in combination at any ratio.

In the water-insoluble polymer (A) in the present invention, the ratio of the ethylenically unsaturated carboxylic acid monomer unit (a2) is usually 0.5 wt % or more, preferably 1 wt % or more, and more preferably 2 wt % or more, and usually 10 wt % or less, preferably 8 wt % or less, and more preferably 7 wt % or less. When the ratio of the ethylenically unsaturated carboxylic acid monomer unit (a2) is set to be equal to or more than the lower limit of the range, the stability of the slurry for a negative electrode of the present invention can be enhanced. When it is set to be equal to or less than the upper limit, an excessive increase in viscosity of the slurry for a negative electrode of the present invention can be prevented, and the slurry can be easily handled.

The (a3) unit is a repeating unit obtained by polymerization of a monomer that is not an aliphatic conjugated diene monomer or an ethylenically unsaturated carboxylic acid monomer, and is a monomer that is copolymerizable with an aliphatic conjugated diene monomer and an ethylenically unsaturated carboxylic acid monomer (this monomer may simply be referred to hereinbelow as "(a3) monomer").

Examples of the (a3) monomer may include an aromatic vinyl monomer, a vinyl cyanide monomer, an unsaturated carboxylic acid alkyl ester monomer, an unsaturated monomer containing a hydroxyalkyl group, and an unsaturated carboxylic acid amide monomer. One species of these examples may be solely used, or two or more species thereof may be used in combination at any ratio. Therefore, the water-insoluble polymer (A) in the present invention may contain solely one species of the (a3) unit, or two or more species thereof in combination at any ratio.

Examples of the aromatic vinyl monomer may include styrene, α-methylstyrene, vinyltoluene, and divinylbenzene. Among them, styrene is preferable. One species of these examples may be solely used, or two or more species thereof may be used in combination at any ratio.

When the aromatic vinyl monomer is used, the water-insoluble polymer (A) may contain an unreacted aliphatic conjugated diene monomer and an unreacted aromatic vinyl monomer as residual monomers. In this case, the amount of the unreacted aliphatic conjugated diene monomer in the water-insoluble polymer (A) is preferably 50 ppm or less, and more preferably 10 ppm or less. The amount of the unreacted aromatic vinyl monomer in the water-insoluble polymer (A) is preferably 1,000 ppm or less, and more preferably 200 ppm or less. In the production of a negative electrode by applying the slurry for a negative electrode of the present invention onto the surface of the collector and drying the slurry, when the amount of the aliphatic conjugated diene monomer in the water-insoluble polymer (A) is set within the aforementioned range, roughing of the surface of the negative electrode due to foaming can be prevented and environmental impact caused by odor can be prevented. Further, when the amount of the aromatic vinyl monomer in the water-insoluble polymer (A) is set within the aforementioned range, environmental impact that might be caused depending on drying conditions and surface roughing of the negative electrode can be suppressed. In addition, the resistance of the water-insoluble polymer (A) to the electrolytic solution can be enhanced.

Examples of the vinyl cyanide monomer may include acrylonitrile, methacrylonitrile, α-chloroacrylonitrile, and α-ethylacrylonitrile. Among them, acrylonitrile and methacrylonitrile are preferable. One species of these examples may be used alone, or two or more species thereof may be used in combination at any ratio.

Examples of the unsaturated carboxylic acid alkyl ester monomer may include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. Among them, methyl methacrylate is preferable. One species of these examples may be solely used, or two or more species thereof may be used in combination at any ratio.

Examples of the unsaturated monomer containing a hydroxyalkyl group may include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethylmethyl fumarate. Among them, β-hydroxyethyl acrylate is preferable. One species of these examples may be solely used, or two or more species thereof may be used in combination at any ratio.

Examples of the unsaturated carboxylic acid amide monomer may include acrylamide, methacrylamide, N-methylol acrylamide, N-methylol methacrylamide, and N,N-dimethyl acrylamide. Among them, acrylamide and methacrylamide are preferable. One species of these examples may be solely used, or two or more species thereof may be used in combination at any ratio.

As the (a3) monomer, a monomer used in the general emulsion polymerization, such as ethylene, propylene, vinyl acetate, vinyl propionate, vinyl chloride, and vinylidene chloride, may also be used. One species of these examples may solely be used, or two or more species thereof may be used in combination at any ratio.

In the water-insoluble polymer (A) in the present invention, the ratio of the (a3) unit is usually 30 wt % or more, and preferably 35 wt % or more, and usually 79.5 wt % or less, and preferably 69 wt % or less. When the ratio of the (a3) unit is set to be equal to or more than the lower limit of the range, the resistance of the negative electrode of the present invention to the electrolytic solution can be enhanced. When the ratio of the (a3) unit is set to be equal to or less than the upper limit of the range, sufficient adhesion property of the negative electrode active material layer with the collector can be obtained in the application of the slurry for a negative electrode of the present invention onto the collector.

The weight average molecular weight of the water-insoluble polymer (A) is preferably 10,000 or more, and more preferably 20,000 or more, and preferably 1,000,000 or less, and more preferably 500,000 or less. When the weight average molecular weight of the water-insoluble polymer (A) falls within the aforementioned range, the strength of the negative electrode of the present invention and the dispersibility of the negative electrode active material are easily improved. Further, the weight average molecular weight of the water-insoluble polymer may be determined by gel permeation chromatography (GPC) using tetrahydrofuran as a developing solvent and polystyrene as standard.

The glass transition temperature of the water-insoluble polymer (A) is preferably −75° C. or higher, more preferably −55° C. or higher, and particularly preferably −35° C. or higher, and usually 40° C. or lower, preferably 30° C. or lower, more preferably 20° C. or lower, and particularly preferably 15° C. or lower. When the glass transition temperature of the water-insoluble polymer (A) falls within the aforementioned range, properties such as flexibility, bonding power, and winding properties of the negative electrode, and adhesion property of the electrode active material layer with the collector are highly balanced, and such a polymer is therefore suitable.

When the water-insoluble polymer (A) is present in the form of particles, the number average particle diameter of particles of the water-insoluble polymer (A) is preferably 50 nm or more, and more preferably 70 nm or more, and preferably 500 nm or less, and more preferably 400 nm or less. When the number average particle diameter of the water-insoluble polymer (A) falls within the aforementioned range, the strength and flexibility of a negative electrode to be obtained can be improved. The presence of the polymer particles may be easily measured by, e.g., the transmission electron microscopy method, the Coulter counter method, and the laser diffraction method.

For example, the water-insoluble polymer (A) is produced by polymerization of a monomer composition containing the aforementioned monomers in an aqueous solvent.

The ratio of each monomer in the monomer composition is usually the same as the ratio of each of the aliphatic conjugated diene monomer unit (a1), the ethylenically unsaturated carboxylic acid monomer unit (a2), and the unit (a3) of the monomer that is copolymerizable with the aliphatic conjugated diene monomer and the ethylenically unsaturated carboxylic acid monomer in the water-soluble polymer (A).

The aqueous solvent is not especially limited as long as the water-insoluble polymer (A) can be dispersed therein. The aqueous solvent is usually selected from aqueous solvents having a boiling point at normal pressure of usually 80° C. or higher, and preferably 100° C. or higher, and usually 350° C. or lower, and preferably 300° C. or lower. Examples of the aqueous solvent may be as follows. In the following examples, numeral in parentheses after a solvent name denotes a boiling point (unit: ° C.) at normal pressure, which is a value calculated by rounding fractions off or down to the nearest whole number.

Examples of the aqueous solvent may include water (100); ketones such as diacetone alcohol (169) and γ-butyrolactone (204); alcohols such as ethyl alcohol (78), isopropyl alcohol (82), and normal propyl alcohol (97); glycol ethers such as propylene glycol monomethyl ether (120), methyl cellosolve (124), ethyl cellosolve (136), ethylene glycol tert-butyl ether (152), butyl cellosolve (171), 3-methoxy-3-methyl-1-butanol (174), ethylene glycol monopropyl ether (150), diethylene glycol monobutyl ether (230), triethylene glycol monobutyl ether (271), and dipropylene glycol monomethyl ether (188); and ethers such as 1,3-dioxolane (75), 1,4-dioxolane (101), and tetrahydrofuran (66). Among them, water is particularly preferable since it has no combustibility and a dispersion of the water-insoluble polymer (A) is easily obtained. With water that is used as a main solvent, an aqueous solvent other than water among the aforementioned solvents may be mixed within a range in which a dispersion state of the water-insoluble polymer (A) can be secured.

The polymerization method is not particularly limited. For example, any method such as a solution polymerization method, a suspension polymerization method, a bulk polymerization method, and an emulsion polymerization method may be used. Further, as the polymerization method, any method such as ion polymerization, radical polymerization, and living radical polymerization may be used. Among them, the emulsion polymerization method is particularly preferable because of its ability to easily produce a polymer having a high molecular weight, and from the viewpoint of manufacturing efficiency in terms of, e.g., that re-dispersion treatment is unnecessary since the obtained polymer as it is may be in a dispersion state in water, and the polymer as it is may be subjected to the production of the slurry for a negative electrode of the present invention.

The emulsion polymerization method may be usually performed in accordance with a conventional method. For example, a method described in "Jikken Kagaku Kouza (Course of Experimental Chemistry)", vol. 28 (published by Maruzen Publishing Co., Ltd., and edited by The Chemical Society of Japan) is performed. This method is a method in which water, additives such as a dispersing agent, an emulsifier and a crosslinking agent, a polymerization initiator, and monomers are placed in a hermetically sealed vessel equipped with a stirrer and a heating device so that the mixture has a predetermined composition; the composition in the vessel is stirred to emulsify the monomers and the like in water; and the temperature is increased while the components are stirred, so as to initiate polymerization. Alternatively, the method may be a method in which the composition is emulsified and then placed in a hermetically sealed vessel, and the reaction is initiated in a similar manner.

Examples of the polymerization initiator may include organic peroxides such as lauroyl peroxide, diisopropyl peroxydicarbonate, di-2-ethylhexyl peroxydicarbonate, tert-butyl peroxypivalate, and 3,3,5-trimethyl hexanoyl peroxide; azo compounds such as $\alpha,\alpha'$-azobisisobutyronitrile; ammonium persulfate; and potassium persulfate. As the polymerization initiator, one species thereof may be solely used, or two or more species thereof may be used in combination at any ratio.

The emulsifier, the dispersing agent, and the polymerization initiator are those usually used in these polymerization methods. Usually, the using amount thereof is set to general using amount. In the polymerization, seed polymerization using seed particles may be performed.

Polymerization temperature and time may be optionally set depending on, e.g., the polymerization method and species of polymerization initiator. Usually, the polymerization temperature is about 30° C. or higher and the polymerization time is about 0.5 hours to 30 hours.

As an auxiliary agent for polymerization, an additive such as amines may be used.

The aqueous dispersion solution of the particles of the water-insoluble polymer (A) thus obtained by these methods may be subjected to pH adjustment to be in a range of usually 5 to 10, and preferably 5 to 9 by, e.g., mixing the solution with an aqueous basic solution containing, e.g., a hydroxide of an alkali metal (for example, Li, Na, K, Rb, and Cs), ammonia, an inorganic ammonium compound (for example, $NH_4Cl$), or an organic amine compound (for example, ethanol amine and diethyl amine). In particular, the pH adjustment using an alkali metal hydroxide is preferable since thereby bonding power (peel strength) between the collector and the negative electrode active material can be enhanced.

The particles of the water-insoluble polymer (A) may be complex polymer particles of two or more species of polymers. The complex polymer particles may be obtained by a method (two-step polymerization method) in which at least one species of monomer component is polymerized through a conventional method, followed by polymerization of at least one other species of monomer component, wherein the polymerization is performed in accordance with a conventional method. When the monomers are thus polymerized in a stepwise procedure, particles having a core-shell structure that has a core layer present in the inside of the particles and a shell layer coating the core layer can be obtained.

The amount of the water-insoluble polymer (A) is usually 0.3 part by weight or more, and preferably 0.5 part by weight or more, and usually 8 parts by weight or less, preferably 4 parts by weight or less, and more preferably 2 parts by weight or less, relative to 100 parts by weight of the negative electrode active material. When the amount of the water-insoluble polymer (A) is set within the aforementioned range, the viscosity of the slurry for a negative electrode of the present invention is adequately adjusted, and the slurry can be smoothly applied onto the collector. Further, the resistance of the negative electrode of the present invention is thereby kept at a low level, and sufficient adhesion strength between the collector and the negative electrode active material layer is obtained. Therefore, separation of the water-insoluble polymer (A) from the negative electrode active material layer can be suppressed in the step of pressurization treatment of the negative electrode active material layer.

[1-3. Water-Soluble Polymer (B)]

The water-soluble polymer (B) in the present invention contains an ethylenically unsaturated carboxylic acid monomer unit (b1), a (meth)acrylic acid ester monomer unit (b2), and a unit (b3) of a sulfonic acid group-containing monomer that is copolymerizable with the ethylenically unsaturated carboxylic acid monomer and the (meth)acrylic acid ester monomer.

The combination of these monomer units as the content is considered to be one of factors that brings about the effects of the present invention. According to the studies by the present inventors, it is assumed that the effects are obtained by the following mechanism. Since the ethylenically unsaturated carboxylic acid monomer unit (b1) contains a carboxyl group, it promotes absorption of the water-soluble polymer (B) to the negative electrode active material. Further, the (meth)acrylic acid ester monomer unit (b2) has a high strength, and stabilizes the molecule of the water-soluble polymer (B). Moreover, since the unit (b3) of the sulfonic acid group-containing monomer that is copolymerizable with an ethylenically unsaturated carboxylic acid monomer and a(meth)acrylic acid ester monomer has a sulfonic acid group ($-SO_3H$), the unit (b3) improves the dispersion stability of the negative electrode active material, prevents removal of the negative electrode active material form the negative electrode active material layer, and suppresses chemical change of the negative electrode active material itself. As a result, the high-temperature storage property and low-temperature output property of the secondary battery can be improved. Further, the aforementioned stable layer covers the negative electrode active material also in the slurry for a negative electrode of the present invention, to thereby suppress aggregation of the negative electrode active material in the solvent. Accordingly, the slurry for a negative electrode of the present invention has excellent dispersion stability.

The ethylenically unsaturated carboxylic acid monomer unit (b1) is a repeating unit obtained by polymerization of an ethylenically unsaturated carboxylic acid monomer. Since the ethylenically unsaturated carboxylic acid monomer unit (b1) contains a carboxyl group, it promotes the absorption of the water-soluble polymer (B) to the negative electrode active material. Therefore, dispersibility of the negative electrode active material is improved. In the slurry for a negative electrode of the present invention, electrostatic repulsion of the carboxyl group also contributes to the improvement in dispersibility of the negative electrode active material.

Examples of the ethylenically unsaturated carboxylic acid monomer may include monocarboxylic acid and derivatives thereof, dicarboxylic acid and acid anhydrides thereof, and derivatives thereof. Examples of the monocarboxylic acid may include acrylic acid, methacrylic acid, and crotonic acid. Examples of the derivatives of monocarboxylic acid may include 2-ethylacrylic acid, isocrotonic acid, $\alpha$-acetoxyacrylic acid, $\beta$-trans-aryloxyacrylic acid, $\alpha$-chloro-$\beta$-E-methoxyacrylic acid, and $\beta$-diaminoacrylic acid. Examples of the dicarboxylic acid may include maleic acid, fumaric acid, and itaconic acid. Examples of the acid anhydrides of dicarboxylic acid may include maleic anhydride, acrylic anhydride, methylmaleic anhydride, and dimethylmaleic anhydride. Examples of the derivatives of dicarboxylic acid may include methylallyl maleate such as methylmaleic acid, dimethylmaleic acid, phenylmaleic acid, chloromaleic acid, dichloromaleic acid, and fluoromaleic acid; and maleate such as diphenyl maleate, nonyl maleate, decyl maleate, dodecyl maleate, octadecyl maleate, and fluoroalkyl maleate. Among them, acrylic acid, methacrylic acid, and itaconic acid are preferable.

As the ethylenically unsaturated carboxylic acid monomer, one species thereof may be solely used, or two or more species thereof may be used in combination at any ratio. Therefore, the water-soluble polymer (B) in the present invention may contain solely one species of the ethylenically unsaturated carboxylic acid monomer units (b1), or two or more species thereof in combination at any ratio.

In the water-soluble polymer (B) in the present invention, the ratio of the ethylenically unsaturated carboxylic acid monomer unit (b1) is usually 20 wt % or more, and usually 60 wt % or less, preferably 50 wt % or less, and more preferably 40 wt % or less. When the amount of the ethylenically unsaturated carboxylic acid monomer unit (b1) is set to be equal to or more than the lower limit of the range, the strength of the water-soluble polymer (B) can be enhanced, and the stability of the slurry for a negative electrode of the present invention can be enhanced. When it is set to be equal to or less than the upper limit, the flexibility of the water-soluble polymer (B) can be enhanced, and the flexibility of the negative electrode can be improved.

The (meth)acrylic acid ester monomer unit (b2) is a repeating unit obtained by polymerization of a (meth)acrylic acid ester monomer.

Examples of the (meth)acrylic acid ester monomer may include alkyl (meth)acrylate esters such as methyl (meth)acrylate, ethyl (meth)acrylate, butyl (meth)acrylate, hexyl (meth)acrylate, and 2-ethylhexyl (meth)acrylate; and carboxylate esters having two or more carbon-carbon double bonds such as ethylene glycol dimethacrylate, diethylene glycol dimethacrylate, and trimethylolpropane triacrylate. Among them, alkyl (meth)acrylate is preferable, and methyl (meth)acrylate, ethyl (meth)acrylate, and butyl (meth)acrylate are more preferable.

As the (meth)acrylic acid ester monomer, one species thereof may be solely used, or two or more species thereof may be used in combination at any ratio. Therefore, the water-soluble polymer (B) in the present invention may contain solely one species of the (meth)acrylic acid ester monomer unit (b2), or two or more species thereof in combination at any ratio.

In the water-soluble polymer (B) in the present invention, the ratio of the (meth)acrylic acid ester monomer unit (b2) is usually 25 wt % or more, preferably 26 wt % or more, and more preferably 28 wt % or more, and usually 78 wt % or less, preferably 75 wt % or less, and more preferably 70 wt % or less. When the amount of the (meth)acrylic acid ester monomer unit (b2) is set to be equal to or more than the lower limit of the range, the high-temperature storage property and low-temperature output property of the secondary battery can be improved. When it is set to be equal to or less than the upper limit, the adhesion property of the negative electrode active material with the collector can be increased.

The unit (b3) of the sulfonic acid group-containing monomer that is copolymerizable with an ethylenically unsaturated carboxylic acid monomer and a (meth)acrylic acid ester monomer is a repeating unit that is obtained by polymerization of another monomer that is copolymerizable with an ethylenically unsaturated carboxylic acid monomer and a (meth)acrylic acid ester monomer and contains a sulfonic acid group. "Another monomer" herein means a monomer that is different from the ethylenically unsaturated carboxylic acid monomer and the (meth)acrylic acid ester monomer.

As described above, a monomer containing a sulfonic acid group is used as the sulfonic acid group-containing monomer that is copolymerizable with an ethylenically unsaturated carboxylic acid monomer and an (meth)acrylic acid ester monomer. Examples of the monomer containing a sulfonic acid may include a sulfonic acid-containing monomer having no functional group other than a sulfonic acid group, a salt thereof, a monomer containing an amido group and a sulfonic acid group, a salt thereof, a monomer containing a hydroxyl group and a sulfonic acid group, and salts thereof. One species of these examples may be solely used, or two or more species thereof may be used in combination at any ratio. Therefore, the water-soluble polymer (B) in the present invention may contain solely one species of the unit (b3) of the sulfonic acid group-containing monomer that is copolymerizable with an ethylenically unsaturated carboxylic acid monomer and a (meth)acrylic acid ester monomer, or two or more species thereof in combination at any ratio.

Examples of the sulfonic acid-containing monomer having no functional group other than a sulfonic acid may include a monomer obtained by sulfonating one of conjugated double bonds of a diene compound such as isoprene and butadiene, vinylsulfonic acid, styrenesulfonic acid, allylsulfonic acid, sulfoethyl methacrylate, sulfopropyl methacrylate, and sulfobutyl methacrylate. Examples of a salt thereof may include a lithium salt, a sodium salt, and a potassium salt thereof. One species of these examples may be solely used, or two or more species thereof may be used in combination at any ratio.

Examples of the monomer containing an amido group and a sulfonic acid group may include 2-acrylamide-2-methylpropanesulfonic acid (AMPS). Examples of a salt thereof may include a lithium salt, a sodium salt, and a potassium salt thereof. One species of these examples may be solely used, or two or more species thereof may be used in combination at any ratio.

Examples of the monomer containing a hydroxyl group and a sulfonic acid group may include 3-allyloxy-2-hydroxypropanesulfonic acid (HAPS). Examples of a salt thereof may include a lithium salt, a sodium salt, and a potassium salt. One species of these examples may be solely used, or two or more species thereof may be used in combination at any ratio.

Among them, it is preferable that the sulfonic acid group-containing monomer that is copolymerizable with an ethylenically unsaturated carboxylic acid monomer and a (meth)acrylic acid ester monomer is styrenesulfonic acid, 2-acrylamide-2-methylpropanesulfonic acid (AMPS), a monomer containing an amido group and a sulfonic acid group, or a salt thereof.

In the water-soluble polymer (B) in the present invention, the ratio of the unit (b3) of the sulfonic acid group-containing monomer that is copolymerizable with an ethylenically unsaturated carboxylic acid monomer and a (meth)acrylic acid ester monomer is usually 2 wt % or more, and usually 15 wt % or less, preferably 10 wt % or less, and more preferably 8 wt % or less. When the water-soluble polymer (B) has high presence density of the sulfonic acid group, the dispersibility of the slurry for a negative electrode is improved. Usually, a cross-linking reaction of sulfonic acid group occurs during production of the negative electrode of the present invention, and as a result, a cross-linking structure is formed by the sulfonic acid groups in the negative electrode active material layer. Since the water-soluble polymer (B) has a sufficient amount of sulfonic acid group, a large number of such cross-linking structures can be formed, and the strength of the negative electrode active material layer can be enforced. In addition, the high-temperature storage property and low-temperature output property of the secondary battery can be improved. Accordingly, it is preferable that the water-soluble polymer (B) contains a large amount of the unit (b3) of the sulfonic acid group-containing monomer that is copolymerizable with an ethylenically unsaturated carboxylic acid monomer and an (meth)acrylic acid ester monomer as in the aforementioned manner. However, when the amount of the unit (b3) of the sulfonic acid group-containing monomer that is copolymerizable with an ethylenically unsaturated carboxylic acid monomer and a (meth)acrylic acid ester monomer is too large, the amounts of the ethylenically unsaturated carboxylic acid monomer unit (b1) and the (meth)acrylic acid ester monomer unit (b2) become relatively small, and therefore, the absorptive property of the water-soluble polymer (B) to the negative electrode active material and the strength are reduced. Therefore, it is preferable that the amount of the unit (b3) of the sulfonic acid group-containing monomer that is copolymerizable with an ethylenically unsaturated carboxylic acid monomer and a (meth)acrylic acid ester monomer is equal to or less than the upper limit of the aforementioned range.

The weight average molecular weight of the water-soluble polymer (B) is preferably 1,000 or more, more preferably 1,500 or more, and particularly preferably 2,000 or more, and preferably 100,000 or less, more preferably 80,000 or less, and particularly preferably 75,000 or less. Further, the weight average molecular weight of a water-soluble polymer may be measured by GPC using a solution in which 0.85 g/mL sodium nitrate is dissolved in 10 vol % acetonitrile aqueous solution as a developing solvent and polyethylene oxide as standard.

When the weight average molecular weight of the water-soluble polymer (B) falls within the aforementioned range, good adhesion strength of the negative electrode active material is obtained in the negative electrode of the present invention. It is not clear why the adhesion strength thus depends on the weight average molecular weight of the water-soluble polymer (B). However, according to the studies by the present inventors, it is assumed that this is based on the following mechanism. For example, too small weight average molecular weight of the water-soluble polymer (B) may bring about high solubility of the water-soluble polymer (B) in a solvent and thus lead to high motility. Therefore, even when the water-soluble polymer (B) is adsorbed on the surface of the negative electrode active material, such a high motility of the water-soluble polymer (B) and high solubility of the water-soluble polymer (B) in the solvent may cause high tendency of removal of the water-soluble polymer (B) from the negative electrode active material. Accordingly, the layer of the water-soluble polymer (B) present on the surface of the negative electrode active material becomes less dense. Consequently, it is assumed that the negative electrode active material may not be stably dispersed. On the other hand, too large weight average molecular weight of the water-soluble polymer (B) may bring about absorption between a plurality of particles of negative electrode active material, and thus lead to cross-linking aggregation. It is assumed that therefore the stability of the negative electrode active material layer may be lowered.

The glass transition temperature of the water-soluble polymer (B) is preferably 0° C. or higher, and usually 70° C. or lower, preferably 50° C. or lower, and more preferably 40° C. or lower. When the glass transition temperature of the water-soluble polymer (B) falls within the aforementioned range, the flexibility of the negative electrode can be increased. The glass transition temperature of the water-soluble polymer (B) is adjustable by combining a variety of monomers.

The viscosity of the water-soluble polymer (B) is preferably 300 mPa·s or more, more preferably 1,000 mPa·s or more, and particularly preferably 2,000 mPa·s or more, and preferably 20,000 mPa·s or less, more preferably 15,000 mPa·s or less, and particularly preferably 12,000 mPa·s or less, when the measurement is performed for 1 wt % aqueous solution. This is because thereby the coating ability of the slurry for a negative electrode can be improved and the adhesion strength with the collector can be enhanced. The aforementioned viscosity is the value measured at 25° C. and a rotation speed of 60 rpm with an E type viscometer.

The pH of the water-soluble polymer (B) is preferably 7 or more, and preferably 13 or less, and more preferably 10 or less, when the measurement is performed for 5 wt % aqueous solution. This is because thereby the coating ability of the slurry for a negative electrode are improved.

The method for producing the water-soluble polymer (B) is not limited. Also, the method for introducing a sulfonic acid group and a carboxylic acid group into the water-soluble polymer (B) is not limited. For example, the introduction may be effected by using a monomer having a sulfonic acid group or a carboxylic acid group in the production of the water-soluble polymer (B). The introduction may also be effected by performing polymerization using a polymerization initiator having a sulfonic acid group or a carboxylic acid group. The introduction may also be performed by effecting both of them.

The amount of the water-soluble polymer (B) is usually 0.01 part by weight or more, preferably 0.03 part by weight or more, and more preferably 0.05 part by weight or more, and usually 5 parts by weight or less, preferably 2 parts by weight or less, more preferably 1 part by weight or less, and particularly preferably 0.5 part by weight or less, relative to 100 parts by weight of the negative electrode active material. When the amount of the water-soluble polymer (B) is set within the aforementioned range, the dispersibility of the negative electrode active material can be improved, and the adhesion property of the negative electrode active material with the collector, and the high-temperature storage property and low-temperature output property of the secondary battery can be enhanced.

The ratio (A)/(B) in parts by weight of the water-insoluble polymer (A) relative to the water-soluble polymer (B) is usually 80/20 or more, and preferably 83/17 or more, and usually 95/5 or less. Having such a ratio, the dispersibility of the negative electrode active material in the slurry for a negative electrode of the present invention can be improved.

[1-4. Solvent]

The slurry for a negative electrode of the present invention usually contains a solvent. The solvent is not limited as long as the negative electrode active material can be dispersed therein and the water-insoluble polymer (A) and the water-soluble polymer (B) can be dissolved or dispersed therein in a form of particles. It is preferable that a solvent capable of dissolving the water-insoluble polymer (A) or the water-soluble polymer (B) is used since thereby the water-insoluble polymer (A) and the water-soluble polymer (B) are adsorbed on the surface of the negative electrode active material to stabilize its dispersion. The specific species of solvents is preferably selected from the viewpoints of drying speed and environment.

As the solvent, either water or an organic solvent may be used. Examples of the organic solvent may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether: alcohols such as methanol, ethanol, isopropanol, ethylene glycol, and ethylene glycol monomethyl ether; and amides such as N-methylpyrrolidone and N,N-dimethylformamide. Among them, N-methylpyrrolidone (NMP) is preferable. As the solvent, one species thereof may be solely used, or two or more species thereof may be used in combination at any ratio. In particular, water is preferably used as the solvent.

The amount of the solvent may be adjusted so that the viscosity of the slurry for a negative electrode of the present invention is suitable for application. Specifically, the amount of the solvent for use is adjusted so that the concentration of solid content of the slurry for a negative electrode of the present invention is preferably 30 wt % or more, and more preferably 40 wt % or more, and preferably 90 wt % or less, and more preferably 80 wt % or less.

[1-5. Viscosity Modifier]

The slurry for a negative electrode of the present invention may contain a viscosity modifier. By containing a viscosity modifier, the viscosity of the slurry can be adjusted to a desired range, whereby the dispersibility of the slurry for a negative electrode of the present invention can be enhanced, and the coating ability of the slurry for a negative electrode can be increased.

As the viscosity modifier, a water-soluble polysaccharide is preferably used. Examples of the polysaccharide may include a natural polymer and a cellulose-based semisynthetic polymer. As the viscosity modifier, one species thereof may be solely used, or two or more species thereof may be used in combination at any ratio.

Examples of the natural polymer may include polysaccharides and proteins that are derived from a plant or an animal. Examples thereof may also include natural polymers that have been subjected to fermentation by microorganisms or heat treatment. These natural polymers may be classified into a plant-derived natural polymer, an animal-derived natural polymer, and a microorganism-derived polymer.

Examples of the plant-derived natural polymer may include gum arabic, gum tragacanth, galactan, guar gum, carob gum, karaya gum, carrageenan, pectin, agar, quince seed (marmelo), algae colloid (brown algae extract), starch (derived from rice, corn, potato, and wheat), and glycyrrhizin. Examples of the animal-derived natural polymer may include collagen, casein, albumin, and gelatin. Examples of the microorganism-derived natural polymer may include xanthan gum, dextran, succinoglucan, and pullulan.

The cellulose-based semisynthetic polymers may be classified into nonioic, anionic, and cationic cellulose-based semisynthetic polymers.

Examples of the nonioic cellulose-based semisynthetic polymer may include an alkyl cellulose such as methyl cellulose, methyl ethyl cellulose, ethyl cellulose, and microcrystalline cellulose; and a hydroxyalkyl cellulose such as hydroxyethyl cellulose, hydroxybutyl methyl cellulose, hydroxypropyl cellulose, hydroxypropyl methyl cellulose, hydroxyethyl methyl cellulose, hydroxypropyl methyl cellulose stearoxy ether, carboxylmethyl hydroxyethyl cellulose, alkyl hydroxyethyl cellulose, and nonoxynyl hydroxyethyl cellulose.

Examples of the anionic cellulose-based semisynthetic polymer may include alkyl cellulose obtained by substitution of the aforementioned nonioic cellulose-based semisynthetic polymers with a variety of derivation groups, and a sodium salt and an ammonium salt thereof. Specific examples thereof may include sodium cellulose sulfate, methyl cellulose, methyl ethyl cellulose, ethyl cellulose, carboxymethyl cellulose (CMC), and salts thereof.

Examples of the cationic cellulose-based semisynthetic polymer may include low-nitrogen hydroxyethyl cellulose dimethyl diallylammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

Among them, the cellulose-based semisynthetic polymer, and a sodium salt and an ammonium salt thereof are preferable since they may have a cationic property, an anionic property, or both. In particular, the anionic cellulose-based semisynthetic polymer is particularly preferable from the viewpoint of dispersibility of the negative electrode active material.

The etherification degree of the cellulose-based semisynthetic polymer is preferably 0.5 or more, and more preferably 0.6 or more, and preferably 1.0 or less, and more preferably 0.8 or less. The etherification degree herein means the degree of substitution of (three) hydroxyl group(s) to form a substitution such as a carboxymethyl group per anhydrous glucose unit in cellulose. Theoretically, the etherification degree may be a value of 0 to 3. When the etherification degree falls within the aforementioned range, the cellulose-based semisynthetic polymer exhibits an excellent dispersibility by being adsorbed on the surface of the negative electrode active material and being compatible with water. Therefore, it is possible to finely disperse the negative electrode active material at the primary particle level.

When a macromolecule (including a polymer) is used as a viscosity modifier, the average polymerization degree of the viscosity modifier that is calculated from the limiting viscosity measured with an Ubbelohde viscometer is preferably 500 or more, and more preferably 1,000 or more, and preferably 2,500 or less, more preferably 2,000 or less, and particularly preferably 1,500 or less. The average polymerization degree of the viscosity modifier may affect the flowability of the slurry for a negative electrode of the present invention, the film uniformity of the negative electrode active material layer, and a process in the steps. However, when the average polymerization degree is set within the aforementioned range, the stability of the slurry for a negative electrode of the present invention over the lapse of time can be improved, and application free of generation of aggregates and uneven thickness can be achieved.

When the slurry for a negative electrode of the present invention contains a viscosity modifier, the amount of the viscosity modifier is usually 0.1 parts by weight or more, and preferably 0.2 parts by weight or more, and usually 5 parts by weight or less, preferably 4 parts by weight or less, and more preferably 3 parts by weight or less, relative to 100 parts by weight of the negative electrode active material. When the amount of the viscosity modifier is set within the aforementioned range, the viscosity of the slurry for a negative electrode of the present invention can be adjusted within a range suitable for handling.

[1-6. Electroconducting Agent]

The slurry for a negative electrode of the present invention may contain an electroconducting agent. The presence of an electroconducting agent can increase electric contact of negative electrode active materials, and therefore, when the electroconducting agent is used in a secondary battery, discharging rate property can be improved.

As the electroconducting agent, electroconductive carbon such as acetylene black, ketjen black, carbon black, graphite, vapor grown carbon fibers, and carbon nanotubes may be used. As the electroconducting agent, one species thereof may be solely used, or two or more species thereof may be used in combination at any ratio.

The amount of the electroconducting agent is preferably 1 to 20 parts by weight, and more preferably 1 to 10 parts by weight, relative to 100 parts by weight of the total amount of the negative electrode active material.

[1-7. Other Components]

In addition to the aforementioned negative electrode active material, water-insoluble polymer (A), water-soluble polymer (B), solvent, viscosity modifier, and electroconducting agent, the slurry for a negative electrode of the present invention may contain other optional components. Examples of the optional components may include a reinforcement material, a leveling agent, and an electrolytic solution additive. The optional components are not particularly limited as long as they do not affect a cell reaction. As the optional component, one species thereof may be solely used, or two or more species thereof may be used in combination at any ratio.

As the reinforcement material, a variety of inorganic or organic fillers in a spherical shape, a plate shape, a rod shape, or a fiber shape may be used. Use of the reinforcement material can impart toughness and flexibility to the negative electrode, and a secondary battery exhibiting excellent long-term cycle property can be realized. The amount of the reinforcement material is usually 0.01 parts by weight or more, and preferably 1 part by weight or more, and usually 20 parts by weight or less, and preferably 10 parts by weight or less, relative to 100 parts by weight of the total amount of the negative electrode active material. When the amount of the reinforcing agent is set within the aforementioned range, the secondary battery can exhibit high capacity and high load property.

Examples of the leveling agent may include surfactants such as an alkyl-based surfactant, a silicone-based surfactant, a fluorine-based surfactant, and a metal-based surfactant. Use of the leveling agent can prevent cissing that otherwise occurs during application of the slurry for a negative electrode, and can also improve the smoothness of a negative electrode. The amount of the leveling agent is preferably 0.01 parts by weight to 10 parts by weight, relative to 100 parts by weight of the total amount of the negative electrode active material. When the amount of the leveling agent falls within the aforementioned range, the productivity during manufacture of a negative electrode, smoothness, and battery property become excellent. When the surfactant is contained, the dispersibility of the negative electrode active material and the like in the slurry for a negative electrode can be enhanced. Further, the smoothness of the negative electrode thus obtained can be improved.

Examples of the electrolytic solution additive may include vinylene carbonate. Use of the electrolytic solution additive can, e.g., suppress the decomposition of electrolyte solution. The amount of the electrolytic solution additive is preferably 0.01 parts by weight to 10 parts by weight, relative to 100 parts by weight of the total amount of the negative electrode active material. When the amount of the electrolytic solution additive falls within the aforementioned range, a secondary battery having excellent cycle property and high-temperature property can be realized.

Examples of the optional components may include nano-fine particles of, e.g., fumed silica, and fumed alumina. When the nano-fine particles are mixed, the thixotropy of the slurry for a negative electrode can be controlled, and further the leveling properties of a negative electrode thus obtained can be improved. The amount of the nano-fine particles is preferably 0.01 parts by weight to 10 parts by weight, relative to 100 parts by weight of the total amount of the negative electrode active material. When the amount of the nano-fine particles falls within the aforementioned range, the stability and productivity of the slurry for a negative electrode can be improved, and high battery property can be realized.

[1-8. Method for Producing Slurry for Negative Electrode]

The slurry for a negative electrode of the present invention may be obtained by mixing the aforementioned negative electrode active material, water-insoluble polymer (A), and water-soluble polymer (B), and, if necessary, the optional components.

Examples of the mixing method may include, but not particularly limited to, methods using a stirring type mixer, a shaking type mixer, or a rotation type mixer. Additional examples thereof may include methods using a homogenizer, a ball mill, a sand mill, a roll mill, a planetary mixer, or a dispersion kneader such as a planetary kneader.

[2. Negative Electrode]

The negative electrode of the present invention (that is, the negative electrode for a secondary battery of the present invention) has a collector and a negative electrode active material layer formed on the surface of the collector. The negative electrode active material layer may be formed on at least one side of the collector, and preferably on both sides of the collector. Since the negative electrode of the present invention contains the negative electrode active material, the water-insoluble polymer (A), and the water-soluble polymer (B) at the aforementioned specific ratio, the negative electrode active material layer adheres to the collector at a high level of adhesion property. In particular, when the collector is formed from copper, the adhesion property is remarkably improved. Further, since the negative electrode active material in the negative electrode of the present invention has a high resistance to the electrolytic solution, the negative electrode has low tendency to cause deterioration even when charging and discharging are repeated. Thus it is thereby possible to extend the service life of the secondary battery.

[2-1. Collector]

The collector for the negative electrode is not particularly limited as long as it is formed from a material having electroconductivity and electrochemical durability. A metal material is preferable since it has heat resistance. Examples of the material for the collector for the negative electrode may include iron, copper, aluminum, nickel, stainless steel, titanium, tantalum, gold, and platinum. Among them, as the collector for the negative electrode of a secondary battery, copper is particularly preferable. As the aforementioned material, one species thereof may be solely used, or two or more species thereof may be used in combination at any ratio.

The shape of the collector is not particularly limited. The collector preferably has a sheet shape with a thickness of about 0.001 mm to 0.5 mm.

It is preferable that the collector is roughened in advance of use for enhancing the adhesion strength of the collector with the electrode active material. Examples of a roughening method may include a mechanical polishing method, an electrolysis polishing method, and a chemical polishing method. In the mechanical polishing method, e.g., polishing paper to which polishing agent particles are fixed, a grind stone, an emery wheel, and a wire brush having steel wire are usually used. Further, in order to improve the adhesion strength and electroconductivity of the negative electrode active material layer, an intermediate layer may be formed on the surface of the collector.

[2-2. Negative Electrode Active Material Layer]

The negative electrode active material layer is a layer containing the negative electrode active material, the water-insoluble polymer (A), and the water-soluble polymer (B). Further, the negative electrode active material layer usually contains a solid content (for example, viscosity modifier and electroconducting agent) which is contained in the slurry for a negative electrode of the present invention. The negative electrode active material, the water-insoluble polymer (A), the water-soluble polymer (B), and an optional solid content that may be used if necessary are the same as described in the section of slurry for a negative electrode of the present invention.

The thickness of the negative electrode active material layer is usually 5 µm or more, and preferably 30 µm or more, and usually 300 µm or less, and preferably 250 µm or less. When the thickness of the negative electrode active material layer fails within the aforementioned range, load property and cycle property can be improved.

The content of the negative electrode active material in the negative electrode active material layer is preferably 85 wt % or more, and more preferably 88 wt % or more, and preferably 99 wt % or less, and more preferably 97 wt % or less. When the content of the negative electrode active material is set within the aforementioned range, a negative electrode that enables high capacity as well as flexibility and bonding power can be realized.

[3. Method for Producing Negative Electrode]

The negative electrode of the present invention may be produced by, e.g., applying the slurry for a negative electrode of the present invention onto a surface of a collector, and then drying the slurry to form a negative electrode active material layer on the surface of the collector.

The method for applying the slurry for a negative electrode of the present invention onto the surface of a collector is not particularly limited. Examples thereof may include a doctor blade method, a dip application method, a reverse roll method, a direct roll method, a gravure method, an extrusion method, and a brush application method.

Examples of the drying method may include drying by warm air, hot air, or low humid air, vacuum drying, and drying methods by irradiation with (far) infrared radiation or electron beam. The drying time is usually 5 minutes to 30 minutes, and the drying temperature is usually 40° C. to 180° C.

It is preferable that, after the application of the slurry for a negative electrode onto the surface of the collector and drying of the slurry, the negative electrode active material layer is subjected to pressurizing treatment using, e.g., die press or roll press, if necessary. The pressurizing treatment can decrease the porosity of the negative electrode active material layer. The porosity is preferably 5% or more, and more preferably 7% or more, and preferably 30% or less, and more preferably 20% or less. When the porosity is set to be equal to or more than the lower limit of the range, a high volume capacity is easily obtained, and the negative electrode active material layer becomes less prone to be separated from the collector. When it is set to be equal to or less than the upper limit, higher charging efficiency and discharging efficiency can be obtained.

When the negative electrode active material layer contains a curable polymer, it is preferable that the polymer is cured after the formation of the negative electrode active material layer.

[4. Secondary Battery]

The secondary battery of the present invention has the negative electrode of the present invention. Usually, the secondary battery of the present invention includes a positive electrode, a negative electrode, a separator, and an electrolytic solution, wherein the negative electrode is the negative electrode of the present invention.

Since the secondary battery of the present invention includes the negative electrode of the present invention, the secondary battery has excellent high-temperature storage property and low-temperature output property. Further, since the negative electrode of the present invention has a high resistance to an electrolytic solution, the capacity thereof is usually less tend to be decreased even when charging and discharging are repeated. Therefore, the secondary battery of the present invention has a long service life.

[4-1 Positive Electrode]

The positive electrode includes a collector and a positive electrode active material layer that is formed on the surface of the collector and contains a positive electrode active material and a binder for a positive electrode.

Collector

The collector of the positive electrode is not particularly limited as long as it is formed from a material having electroconductivity and electrochemical durability. As the collector of the positive electrode, collectors used for the negative electrode of the present invention may be used. In particular, aluminum is particularly preferable.

Positive Electrode Active Material

When the secondary battery of the present invention is, e.g., a lithium ion secondary battery, a substance capable of doping and dedoping a lithium ion may be used as the positive electrode active material. Such a positive electrode active material is classified into a material formed of an inorganic compound and a material formed of an organic compound.

Examples of the positive electrode active material formed of an inorganic compound may include transition metal oxides, transition metal sulfides, and lithium-containing complex metal oxides of lithium and transition metal.

As the transition metal, e.g., Ti, V, Cr, Mn, Fe, Co, Ni, Cu, or Mo is used.

Examples of the transition metal oxides may include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, and $V_6O_{13}$. Among them, MnO, $V_2O_6$, $V_6O_{13}$, and $TiO_2$ are preferable from the viewpoints of cycle stability and capacity.

Examples of the transition metal sulfides may include $TiS_2$, $TiS_3$, amorphous $MoS_2$, and FeS.

Examples of the lithium-containing complex metal oxides may include a lithium-containing complex metal oxide having a layered structure, a lithium-containing complex metal oxide having a spinel structure, and a lithium-containing complex metal oxide having an olivine structure.

Examples of the lithium-containing complex metal oxide having a layered structure may include a lithium-containing cobalt oxide ($LiCoO_2$), a lithium-containing nickel oxide ($LiNiO_2$), a lithium complex oxide of Co—Ni—Mn, a lithium complex oxide of Ni—Mn—Al, and a lithium complex oxide of Ni—Co—Al.

Examples of the lithium-containing complex metal oxide having a spinel structure may include lithium manganate ($LiMn_2O_4$), and $Li[Mn_{3/2}M_{1/2}]O_4$ in which some Mn are substituted with other transition metals (wherein M represents Cr, Fe, Co, Ni or Cu).

Examples of the lithium-containing complex metal oxide having an olivine structure may include an olivine type lithium phosphate compound represented by $Li_xMPO_4$ (wherein M represents at least one selected from the group consisting of Mn, Fe, Co, Ni, Cu, Mg, Zn, V, Ca, Sr, Ba, Ti, Al, Si, B, and Mo, and X represents a number satisfying $0 \leq X \leq 2$).

Examples of the positive electrode active material formed of an organic compound may include electroconductive polymers such as polyacetylene and poly-p-phenylene.

Further, a positive electrode active material formed of a composite material that is a combination of an inorganic compound and an organic compound may also be used. For example, an iron-containing oxide may be subjected to reduction-firing in the presence of a carbon source material to produce a composite material coated with a carbon material, and the composite material may be used as a positive electrode active material. An iron-containing oxide tends to have poor electroconductivity. However, it may be used as a high performance positive electrode active material by forming such a composite material.

Further, those obtained by partial element substitution of the aforementioned compound may also be used as a positive electrode active material. In addition, a mixture of the inorganic compound and the organic compound may also be used as the positive electrode active material.

As the positive electrode active material, one species thereof may be solely used, or two or more species thereof may be used in combination at any ratio.

The average particle diameter of particles of the positive electrode active material is usually 1 µm or more, and preferably 2 µm or more, and usually 50 µm or less, and preferably 30 µm or less. When the average particle diameter of particles of the positive active material is set within the aforementioned range, the amount of a binder for forming the positive electrode active material layer can be reduced, and capacity reduction of the secondary battery can be suppressed. For forming the positive electrode active material layer, a slurry containing a positive electrode active material and a binder (appropriately referred to hereinbelow as "slurry for a positive electrode") are usually prepared. The viscosity of the slurry for a positive electrode is easily adjusted to a proper viscosity for facilitating application, and a uniform positive electrode can thereby be produced.

The content of the positive electrode active material in the positive electrode active material layer is preferably 90 wt % or more, and more preferably 95 wt % or more, and preferably 99.9 wt % or less, and more preferably 99 wt % or less. When the content of the positive electrode active material is set within the aforementioned range, the secondary battery can have a high capacity, and the flexibility of the positive electrode and the bonding power of the positive electrode active material layer with the collector can be enhanced.

Binder for Positive Electrode

As the binder for the positive electrode, a resin such as polyethylene, polytetrafluoroethylene (PTFE), polyvinylidene fluoride (PVDF), a tetrafluoroethylene-hexafluoropropylene copolymer (FEP), a polyacrylic acid derivative, and a polyacrylonitrile derivative; or a soft polymer such as an acryl soft polymer, a diene soft polymer, an olefin soft polymer, and a vinyl soft polymer may be used. As the binder, one species thereof may be solely used, or two or more species thereof may be used in combination at any ratio.

Other Components Optionally Contained in Positive Electrode Active Material Layer If necessary, the positive electrode active material layer may contain optional components in addition to the positive electrode active material and the binder. Examples thereof may include a viscosity modifier, a electroconducting agent, a reinforcement material, a leveling agent, and an electrolytic solution additive. As the optional component, one species thereof may be solely used, or two or more species thereof may be used in combination at any ratio.

Thickness of Positive Electrode Active Material Layer

The thickness of the positive electrode active material layer is usually 5 µm or more, and preferably 10 µm or more, and usually 300 µm or less, and preferably 250 µm or less. When the thickness of the positive electrode active material layer falls within the aforementioned range, high properties of both load property and energy density can be realized.

Method for Producing Positive Electrode

The positive electrode may be produced by, e.g., the same procedure as the aforementioned procedure for producing the negative electrode of the secondary battery.

[4-2. Separator]

As the separator, a porous substrate having pore portions is usually used. Examples of the separator may include (a) a porous separator having pore portions, (b) a porous separator having a polymer coating layer on one or both sides, and (c) a porous separator having a porous resin coating layer containing inorganic ceramic powders. Specific examples thereof may include polypropylene-based, polyethylene-based, polyolefin-based, and aramid-based porous separators, polymer films for a solid polymer electrolyte or a gel-like polymer electrolyte that are made of polyvinylidene fluoride, polyethylene oxide, polyacrylonitrile, or a polyvinylidene fluoride hexafluoropropylene copolymer; a separator coated with a gelled polymer coating layer; and a separator coated with a porous membrane layer formed of inorganic fillers and a dispersant for the inorganic fillers.

[4-3. Electrolytic Solution]

As the electrolytic solution, a solution in which a lithium salt as a supporting electrolyte is dissolved in a non-aqueous solvent may be used. Examples of the lithium salt may include lithium salts such as $LiPF_6$, $LiAsF_6$, $LiBF_4$, $LiSbF_6$, $LiAlCl_4$, $LiClO_4$, $CF_3SO_3Li_1$, $C_4F_9SO_3Li_1$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which are highly soluble in a solvent and shows a high dissociation degree is suitably used. One species of these examples may be solely used, or two or more species thereof may be used in combination at any ratio.

The amount of the supporting electrolyte is usually 1 wt % or more, and preferably 5 wt % or more, and usually 30 wt % or less, and preferably 20 wt % or less, relative to the electrolytic solution. When the amount of the supporting electrolyte is too small or too large, the ion conductivity tends to decrease, and the charging property and discharging property of the secondary battery may possibly decrease.

The solvent used for the electrolytic solution is not particularly limited as long as the supporting electrolyte can be dissolved therein. Examples of the solvent for use may include alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Particularly, dimethyl carbonate, ethylene carbonate, propylene carbonate, diethyl carbonate, and methyl ethyl carbonate are preferable because of its tendency to give high ion conductivity and its wide temperature range for use. As the solvent, one species thereof may be solely used, or two or more species thereof may be used in combination at any ratio.

If necessary, the electrolytic solution may further contain an additive. As the additive, a carbonate compound such as vinylene carbonate (VC) is preferable. As the additive, one species thereof may be solely used, or two or more species thereof may be used in combination at any ratio.

Examples of electrolytic solutions other than the aforementioned electrolytic solutions may include a gelled polymeric electrolyte in which a polymeric electrolyte such as polyethylene oxide and polyacrylonitrile is impregnated with an electrolytic solution; and an inorganic solid electrolyte such as lithium sulfide, LiI, and $Li_3N$.

[4-4. Method for Producing Secondary Battery]

The method for producing the secondary battery of the present invention is not particularly limited. For example, the negative electrode and positive electrode are stacked with the separator interposed therebetween, and the resulting article is then wound or folded in conformity with the shape of the battery and then put in a battery container. Subsequently, the electrolytic solution is poured into the battery container, and the container is sealed. If necessary, expanded metal; an overcurrent protective element such as a fuse and a PTC element; and a lead plate may be put into the container to prevent an increase in the pressure inside the battery, and to prevent overcharging and overdischarging. The shape of the battery may be any of a laminated cell shape, a coin shape, a button shape, a sheet shape, a cylindrical shape, a rectangular shape, and a flat shape.

EXAMPLES

The present invention will be specifically described hereinbelow by referring to Examples. However, the present invention is not limited to the following Examples. The present invention may be implemented with any modifications without departing from the scope of the claims and equivalents thereof. Unless otherwise stated, and "part" that represent an amount in the following description are based on weight.

[Evaluation Method]
[Flexibility Test for Negative Electrode]

FIG. 1 schematically shows an appearance of a flexibility test for a negative electrode. A bend test for negative electrodes was performed in accordance with the mandrel test (JIS K 5600). A mandrel having a diameter of 3 mm was used. The negative electrode was wound around the outside of the mandrel. The surface of the negative electrode was observed with a digital microscope. As to the folded sample 10, the length T of the electrode in the folded part when the electrode active material layer was cracked was measured. Short electrode length T is indicative of high flexibility of the negative electrode.

[Peel Strength]

A negative electrode was cut into a rectangle of 1 cm in width and 10 cm in length to form a sample, and the sample was secured with the negative electrode active material layer facing upward. A cellophane tape was attached to the surface of the electrode active material layer of the sample. The cellophane tape was peeled from an end of the sample at a speed of 50 mm/min in a 180° direction with respect to the surface of the negative electrode active material layer, and the stress at this time was measured. The measurement was repeated 10 times, and an average value was calculated and taken as peel strength. Large value is indicative of strong adhesion strength of the negative electrode.

[High-Temperature Storage Property of Battery]

Charging and discharging of 10 cells of laminate-cell type batteries were performed. That is, the batteries were charged to 4.25 V by a constant current method of 0.2 C under an atmosphere of 25° C., stored for one week under an atmosphere of 60° C., and then discharged to 3.0 V under an atmosphere of 25° C., and the electric capacity was measured. The average value in 10 cells was taken as a measurement value, and the charging/discharging capacity retention rate, represented by the ratio (%) of capacitance after one-week storage to that before one-week storage, was calculated. The charging/discharging capacity retention ratio was used as the criteria for evaluation for high-temperature storage property. Large value is indicative of excellent high-temperature storage property.

[Low-Temperature Output Property of Battery]

10 cells of laminate-cell type batteries were charged to 4.2 V at a constant current of 0.1 C at 25° C., and then discharged at a constant current of 1 C at −30° C. Ten seconds after the discharging, a voltage drop (ΔV) was measured. Small value is indicative of small internal resistance and ability to perform high-speed charging/discharging.

[Measurement of Viscosity of Water-Soluble Polymer]

A water-soluble polymer was dissolved in water to prepare a 1 wt % aqueous solution. To the solution, diluted aqueous ammonia was added. The maximum viscosity of the mixture at pH of 5 to 8 was measured with an E-type viscometer at 25° C. and a revolution speed of 60 rpm. The viscosity was thus determined.

Production Example A-1

Production of Water-Insoluble Polymer (A1)

In a 5-MPa pressure-resistant container equipped with a stirrer, 47 parts of 1,3-butadiene as an aliphatic conjugated diene monomer, 3 parts of methacrylic acid as an ethylenically unsaturated carboxylic acid monomer, 50 parts of styrene as a monomer copolymerizable therewith, 4 parts of sodium dodecylbenzenesulfonate as an emulsifier, 150 parts of ion exchanged water, 0.4 parts of t-dodecyl mercaptan as a chain-transfer agent, and 0.5 parts of potassium persulfate as a polymerization initiator were placed and sufficiently stirred. Then, the mixture was warmed to 50° C. to initiate polymerization. When the polymerization conversion rate reached 96%, the reaction was cooled to terminate the reaction, to thereby obtain a water-insoluble polymer (A1) as the water-insoluble polymer (A).

Production Example A-2

Production of Water-Insoluble Polymer (A2)

A water-insoluble polymer (A2) was obtained as the water-insoluble polymer (A) in the same manner as in Production Example A-1 except that the amount of 1,3-butadiene was changed to 29 parts and the amount of styrene was changed to 68 parts.

Production Example A-3

Production of Water-Insoluble Polymer (A3)

A water-insoluble polymer (A3) was obtained as the water-insoluble polymer (A) in the same manner as in Production Example A-1 except that the amount of 1,3-butadiene was changed to 40 parts and the amount of styrene was changed to 57 parts.

Production Example A-4

Production of Water-Insoluble Polymer (A4)

A water-insoluble polymer (A4) was obtained as the water-insoluble polymer (A) in the same manner as in Production Example A-1 except that itaconic acid was used in place of methacrylic acid.

Production Example A-5

Production of Water-Insoluble Polymer (A5)

A water-insoluble polymer (A5) was obtained as the water-insoluble polymer (A) in the same manner as in Production Example A-1 except that acrylic acid was used in place of methacrylic acid.

Production Example A-6

Production of Water-Insoluble Polymer (A6)

A water-insoluble polymer (A6) was obtained as the water-insoluble polymer (A) in the same manner as in Production Example A-1 except that the amount of methacrylic acid was changed to 6 parts and the amount of styrene was changed to 47 parts.

Production Example A-7

Production of Water-Insoluble Polymer (A7)

A water-insoluble polymer (A7) was obtained as the water-insoluble polymer (A) in the same manner as in Production Example A-1 except that the amount of 1,3-butadiene was changed to 57 parts and the amount of styrene was changed to 40 parts.

Production Example A-8

Production of Water-Insoluble Polymer (A8)

A water-insoluble polymer (A8) was obtained as the water-insoluble polymer (A) in the same manner as in Production Example A-1 except that the amount of 1,3-butadiene was changed to 47.5 parts, the amount of styrene was changed to 50.5 parts, and the amount of methacrylic acid was changed to 2 parts.

Production Example A-9

Production of Water-Insoluble Polymer (A9)

A water-insoluble polymer (A9) was obtained as the water-insoluble polymer (A) in the same manner as in Production Example A-1 except that the amount of 1,3-butadiene was changed to 24 parts and the amount of styrene was changed to 73 parts.

Production Example B-1

Production of Water-Soluble Polymer (B1)

In a 1-L separable flask that was made of SUS and equipped with a stirrer, a reflux condenser and a thermometer, demineralized water was placed and sufficiently stirred. The water was warmed to 70° C., and 0.2 parts of potassium persulfate aqueous solution were added thereto.

In another 5-MPa pressure-resistant container equipped with a stirrer, 50 parts of ion exchanged water, 0.4 parts of sodium hydrogen carbonate, 0.115 parts of 30% sodium dodecyl diphenyl ether sulfonate as an emulsifier, and a monomer mixture of 30 parts of methacrylic acid as an ethylenically unsaturated carboxylic acid monomer, 35 parts of ethyl acrylate and 32.5 parts of butyl acrylate as (meth)acrylic acid ester monomer units, and 2.5 parts of 2-acrylamide-2-methylpropanesulfonic acid (AMPS) as a sulfonic acid-containing monomer co-polymerized therewith were placed and sufficiently stirred to prepare an emulsion aqueous solution.

The resulting emulsion aqueous solution was continuously added dropwise to the separable flask over 4 hours. When the polymerization conversion rate reached 90%, the reaction temperature was set to 80° C., and the reaction was further performed for additional 2 hours. The reaction was then cooled to terminate the reaction, to thereby obtain an aqueous dispersion solution containing a water-soluble polymer (B1). The polymerization conversion rate was found to be 99%. The amount of sulfonic acid monomer unit in the water-soluble polymer (B1) was found to be 2.5 wt %. Further, the weight average molecular weight of the water-soluble polymer (B1) was measured by GPC and was found to be 25,000. A 1 wt % aqueous solution of the obtained water-soluble polymer (B1) was prepared, and the viscosity thereof was found to be 3,000 (mPa·s).

Production Example B-2

Production of Water-Soluble Polymer (B2)

A water-soluble polymer (B2) was obtained as the water-soluble polymer (B) in the same manner as in Production Example B-1 except that the amount of ethyl acrylate was changed to 31.5 parts, the amount of butyl acrylate was changed to 31.5 parts, and the amount of AMPS was changed to 7 parts. The amount of sulfonic acid monomer unit in the water-soluble polymer (B2) was found to be 7 wt %. Further, the weight average molecular weight of the water-soluble polymer (B2) was found to be 10,000. A 1 wt % aqueous solution of the obtained water-soluble polymer (B2) was prepared, and the viscosity thereof was found to be 1,200 (mPa·s).

Production Example B-3

Production of Water-Soluble Polymer (B3)

A water-soluble polymer (B3) was obtained as the water-soluble polymer (B) in the same manner as in Production Example B-1 except that styrenesulfonic acid was used in place of AMPS. The amount of sulfonic acid monomer unit in the water-soluble polymer (B3) was found to be 2.5 wt %. Further, the weight average molecular weight of the water-soluble polymer (B3) was found to be 70,000. A 1 wt % aqueous solution of the obtained water-soluble polymer (B3) was prepared, and the viscosity thereof was found to be 8,400 (mPa·s).

Production Example B-4

Production of Water-Soluble Polymer (B4)

A water-soluble polymer (B4) was obtained as the water-soluble polymer (B) in the same manner as in Production Example B-3 except that the amount of ethyl acrylate was changed to 31.5 parts, the amount of butyl acrylate was changed to 31.5 parts, and the amount of styrenesulfonic acid was changed to 7 parts. The amount of sulfonic acid monomer unit in the water-soluble polymer (B4) was found to be 7 wt %. Further, the weight average molecular weight of the water-soluble polymer (B4) was found to be 50,000. A 1 wt % aqueous solution of the obtained water-soluble polymer (B4) was prepared, and the viscosity thereof was found to be 6,000 (mPa·s).

Production Example B-5

Production of Water-Soluble Polymer (B5)

A water-soluble polymer (B5) was obtained as the water-soluble polymer (B) in the same manner as in Production Example B-1 except that 4-sulfobutyl methacrylate was used in place of AMPS. The amount of sulfonic acid monomer unit in the water-soluble polymer (B5) was found to be 2.5 wt %. Further, the weight average molecular weight of the water-soluble polymer (B5) was found to be 10,000. A 1 wt % aqueous solution of the obtained water-soluble polymer (B5) was prepared, and the viscosity thereof was found to be 1,200 (mPa·s).

Production Example B-6

Production of Water-Soluble Polymer (B6)

A water-soluble polymer (B6) was obtained as the water-soluble polymer (B) in the same manner as in Production Example B-5 except that the amount of ethyl acrylate was changed to 31.5 parts, the amount of butyl acrylate was changed to 31.5 parts, and the amount of 4-sulfobutyl methacrylate was changed to 7 parts. The amount of sulfonic acid monomer unit in the water-soluble polymer (B6) was found to be 7 wt %. Further, the weight average molecular weight of the water-soluble polymer (B6) was found to be 6,000. A 1 wt % aqueous solution of the obtained water-soluble polymer (B6) was prepared, and the viscosity thereof was found to be 700 (mPa·s).

Production Example B-7

Production of Water-Soluble Polymer (B7)

A water-soluble polymer (B7) was obtained as the water-soluble polymer (B) in the same manner as in Production Example B-1 except that acrylic acid was used in place of methacrylic acid. The amount of sulfonic acid monomer unit in the water-soluble polymer (B7) was found to be 2.5 wt %. Further, the weight average molecular weight of the water-soluble polymer (B7) was found to be 25,000. A 1 wt % aqueous solution of the obtained water-soluble polymer (B7) was prepared, and the viscosity thereof was found to be 3,000 (mPa·s).

Production Example B-8

Production of Water-Soluble Polymer (B8)

A water-soluble polymer (B8) was obtained as the water-soluble polymer (B) in the same manner as in Production Example B-1 except that the amount of methacrylic acid was changed to 60 parts, the amount of ethyl acrylate was changed to 15 parts, the amount of butyl acrylate was changed to 15 parts, and the amount of AMPS was changed to 10 parts. The amount of sulfonic acid monomer unit in the water-soluble polymer (B8) was found to be 10 wt %. Further, the weight average molecular weight of the water-soluble polymer (B8) was found to be 3,000. A 1 wt % aqueous solution of the obtained water-soluble polymer (B8) was prepared, and the viscosity thereof was found to be 350 (mPa·s).

Production Example B-9

Production of Water-Soluble Polymer (B9)

A water-soluble polymer (B9) was obtained in the same manner as in Production Example B-1 except that the amount of methacrylic acid was changed to 64 parts, the amount of ethyl acrylate was changed to 17.5 parts, the amount of butyl acrylate was changed to 17.5 parts, and the amount of AMPS was changed to 1 part. The amount of sulfonic acid monomer unit in the water-soluble polymer (B9) was found to be 1 wt %. Further, the weight average molecular weight of the water-soluble polymer (B9) was found to be 50,000. A 1 wt % aqueous solution of the obtained water-soluble polymer (B9) was prepared, and the viscosity thereof was found to be 6,000 (mPa·s).

Production Example B-10

Production of Water-Soluble Polymer (B10)

A water-soluble polymer (B10) was obtained in the same manner as in Production Example B-1 except that the amount of ethyl acrylate was changed to 26.5 parts, the amount of butyl acrylate was changed to 26.5 parts, and the amount of AMPS was changed to 17 parts. The amount of sulfonic acid monomer unit in the water-soluble polymer (B10) was found to be 17 wt %. Further, the weight average molecular weight of the water-soluble polymer (B10) was found to be 100,000. A 1 wt % aqueous solution of the obtained water-soluble polymer (B10) was prepared, and the viscosity thereof was found to be 12,000 (mPa·s).

Production Example B-11

Production of Water-Soluble Polymer (B11)

A water-soluble polymer (B11) was obtained in the same manner as in Production Example B-1 except that the amount of methacrylic acid was changed to 18 parts, the amount of ethyl acrylate was changed to 39.75 parts, and the amount of butyl acrylate was changed to 39.75 parts. The amount of sulfonic acid monomer unit in the water-soluble polymer (B11) was found to be 2.5 wt %. Further, the weight average molecular weight of the water-soluble polymer (B11) was found to be 20,000. A 1 wt % aqueous solution of the obtained water-soluble polymer (B11) was prepared, and the viscosity thereof was found to be 3,800 (mPa·s).

Example 1

Production of Slurry for Negative Electrode of Secondary Battery

As a thickener, carboxymethyl cellulose (abbreviation "CMC", "BSH-12" manufactured by DAI-ICHI KOGYO SEIYAKU CO., LTD.) was used. The polymerization degree of the thickener was 1,700 and the etherification degree was 0.65.

Artificial graphite (average particle diameter: 24.5 μm, distance between graphite layers (interval of (002) plane (d value)) by the X-ray diffraction method: 0.354 nm) was used as the negative electrode active material.

In a planetary mixer equipped with a disper, 100 parts of artificial graphite and 1 part of 1% aqueous solution of the thickener were each placed, and the solid concentration was adjusted to 55% with ion-exchanged water. The mixture was stirred at 25° C. for 60 minutes. Subsequently, the solid concentration was adjusted to 52% with ion-exchanged water, and the mixture was stirred at 25° C. for 15 minutes to obtain a mixed solution.

To the mixed solution, the water-insoluble polymer (A1) and the water-soluble polymer (B1) in a total amount of 1 part (based on solid content) were added so as to adjust the final solid content concentration to 50%, and the mixture was mixed for 10 minutes. This mixture was defoamed under reduced pressure to obtain a slurry for a negative electrode of a secondary battery having good fluidity. The ratio in parts by weight of the water-insoluble polymer (A1) relative to the water-soluble polymer (B1) (water-insoluble polymer (A1)/water-soluble polymer (B1)) was 90/10.

(Production of Negative Electrode)

The slurry for a negative electrode of a secondary battery was applied onto the surface of copper foil having a thickness of 20 μm with a comma coater so that a film thickness after drying was about 200 μm, dried for 2 minutes (at a speed of 0.5 m/min at 60° C.), and then heat-treated for 2 minutes (at 120° C.) to obtain a raw material for an electrode. The raw material for an electrode was rolled with a roll press machine to obtain a negative electrode for a secondary battery having a negative electrode active material layer with a thickness of 80 μm.

(Production of Secondary Battery)

To 95 parts of $LiCoO_2$ having a layered structure as a positive electrode active material, poly(vinylidene fluoride) (PVDF) as a binder for a positive electrode active material layer was added so that the solid content thereof was 3 parts, and 2 parts of acetylene black and 20 parts of N-methylpyrrolidone were further added. The mixture was mixed with a planetary mixer to obtain a slurry for a positive electrode in a form of slurry. The slurry for a positive electrode was applied onto an aluminum foil having a thickness of 18 μm, dried at 120° C. for 30 minutes, and roll-pressed to obtain a positive electrode having a thickness of 60 μm.

The positive electrode was cut into a disc shape having a diameter of 13 mm, and the negative electrode was cut into a disc shape having a diameter of 14 mm. A separator with a porous film was cut into a disc shape having a diameter of 18 mm. The separator and the negative electrode were sequentially stacked on the electrode active material layer side of the positive electrode, and the stacked article was inserted into a coin-type outer container that was made of stainless steel and equipped with a polypropylene packing. An electrolytic solution (solvent: EC/DEC=1/2, electrolyte: $LiPF_6$ at a concentration of 1 M) was poured into the container so that air did not remain therein. The container was covered with a cap made of stainless steel with a thickness of 0.2 mm via the polypropylene packing, and secured to seal a battery can. Thus, a lithium ion secondary battery having a diameter of 20 mm and a thickness of about 3.2 mm (coin cell CR2032) was obtained.

(Evaluation)

The negative electrode and secondary battery thus produced were evaluated in the accordance with the aforementioned procedures. The results are shown in Table 1.

Example 2

A negative electrode and a secondary battery were produced and evaluated in the same manner as in Example 1 except that the water-soluble polymer (B2) was used in place of the water-soluble polymer (B1). The results are shown in Table 1.

Example 3

A negative electrode and a secondary battery were produced and evaluated in the same manner as in Example 1 except that the ratio in parts by weight of the water-insoluble polymer (A1) relative to the water-soluble polymer (B1) (water-insoluble polymer (A1)/water-soluble polymer (B1)) was changed to 85/15. The results are shown in Table 1.

Example 4

A negative electrode and a secondary battery were produced and evaluated in the same manner as in Example 1 except that the water-insoluble polymer (A2) was used in place of the water-insoluble polymer (A1). The results are shown in Table 1.

Example 5

A negative electrode and a secondary battery were produced and evaluated in the same manner as in Example 1 except that the water-soluble polymer (B3) was used in place of the water-soluble polymer (B1). The results are shown in Table 1.

Example 6

A negative electrode and a secondary battery were produced and evaluated in the same manner as in Example 1 except that the water-soluble polymer (B4) was used in place of the water-soluble polymer (B1). The results are shown in Table 2.

Example 7

A negative electrode and a secondary battery were produced and evaluated in the same manner as in Example 1 except that the water-soluble polymer (B5) was used in place of the water-soluble polymer (B1). The results are shown in Table 2.

Example 8

A negative electrode and a secondary battery were produced and evaluated in the same manner as in Example 1 except that the water-soluble polymer (B6) was used in place of the water-soluble polymer (B1). The results are shown in Table 2.

Example 9

A negative electrode and a secondary battery were produced and evaluated in the same manner as in Example 1 except that the water-insoluble polymer (A3) was used in place of the water-insoluble polymer (A1). The results are shown in Table 2.

Example 10

A negative electrode and a secondary battery were produced and evaluated in the same manner as in Example 1 except that the water-insoluble polymer (A4) was used in place of the water-insoluble polymer (A1). The results are shown in Table 2.

Example 11

A negative electrode and a secondary battery were produced and evaluated in the same manner as in Example 1 except that the water-insoluble polymer (A5) was used in place of the water-insoluble polymer (A1). The results are shown in Table 3.

Example 12

A negative electrode and a secondary battery were produced and evaluated in the same manner as in Example 1 except that the water-insoluble polymer (A6) was used in place of the water-insoluble polymer (A1). The results are shown in Table 3.

Example 13

A negative electrode and a secondary battery were produced and evaluated in the same manner as in Example 1 except that the water-insoluble polymer (A7) was used in place of the water-insoluble polymer (A1). The results are shown in Table 3.

Example 14

A negative electrode and a secondary battery were produced and evaluated in the same manner as in Example 1 except that the water-soluble polymer (B7) was used in place of the water-soluble polymer (B1). The results are shown in Table 3.

Example 15

A negative electrode and a secondary battery were produced and evaluated in the same manner as in Example 3 except that the ratio in parts by weight of the water-insoluble polymer (A1) relative to the water-soluble polymer (B1) (water-insoluble polymer (A1)/water-soluble polymer (B1)) was changed to 93/7. The results are shown in Table 3.

Example 16

A negative electrode and a secondary battery were produced and evaluated in the same manner as in Example 1 except that the amount of the water-insoluble polymer (A1) (based on solid content) was changed to 2.83 parts and the amount of the water-soluble polymer (B1) (based on solid content) was changed to 0.5 part relative to 100 parts of artificial graphite that was a negative electrode active material. The results are shown in Table 4.

Example 17

A negative electrode and a secondary battery were produced and evaluated in the same manner as in Example 1 except that the water-insoluble polymer (A8) was used in place of the water-insoluble polymer (A1). The results are shown in Table 4.

Example 18

A negative electrode and a secondary battery were produced and evaluated in the same manner as in Example 1 except that the amount of the water-insoluble polymer (A1) (based on solid content) was changed to 4 parts and the amount of the water-soluble polymer (B1) (based on solid content) was changed to 1 part relative to 100 parts of artificial graphite that was a negative electrode active material. The results are shown in Table 4.

Example 19

A negative electrode and a secondary battery were produced and evaluated in the same manner as in Example 1 except that the water-insoluble polymer (A9) was used in place of the water-insoluble polymer (A1). The results are shown in Table 4.

Example 20

A negative electrode and a secondary battery were produced and evaluated in the same manner as in Example 1 except that the water-soluble polymer (B8) was used in place of the water-soluble polymer (B1). The results are shown in Table 4.

Example 21

A negative electrode and a secondary battery were produced and evaluated in the same manner as in Example 1 except that the amount of the water-insoluble polymer (A1) (based on solid content) was changed to 0.72 parts and the amount of the water-soluble polymer (B1) (based on solid content) was changed to 0.08 parts relative to 100 parts of artificial graphite that was a negative electrode active material. The results are shown in Table 5.

Comparative Example 1

A negative electrode and a secondary battery were produced and evaluated in the same manner as in Example 1 except that the ratio in parts by weight of the water-insoluble polymer (A1) relative to the water-soluble polymer (B1) (water-insoluble polymer (A1)/water-soluble polymer (B1)) was changed to 97/3. The results are shown in Table 5.

Comparative Example 2

A negative electrode and a secondary battery were produced and evaluated in the same manner as in Example 1 except that the water-soluble polymer (B9) was used in place of the water-soluble polymer (B1). The results are shown in Table 5.

Comparative Example 3

A negative electrode and a secondary battery were produced and evaluated in the same manner as in Example 1 except that the water-soluble polymer (B10) was used in place of the water-soluble polymer (B1). The results are shown in Table 5.

Comparative Example 4

A negative electrode and a secondary battery were produced and evaluated in the same manner as in Example 1 except that the water-soluble polymer (B11) was used in place of the water-soluble polymer (B1). The results are shown in Table 5.

TABLE 1

[results of Examples 1 to 5]

|  |  |  | Ex. 1 | Ex. 2 | Ex. 3 | Ex. 4 | Ex. 5 |
|---|---|---|---|---|---|---|---|
| Water-insoluble polymer (A) | Production Example number | | A1 | A1 | A1 | A2 | A1 |
| | Aliphatic conjugated diene monomer (a1) | Species | 1,3-butadiene | 1,3-butadiene | 1,3-butadiene | 1,3-butadiene | 1,3-butadiene |
| | | Amount (part) | 47 | 47 | 47 | 29 | 47 |
| | Ethylenically unsaturated carboxylic acid monomer (a2) | Species | Methacrylic acid | Methacrylic acid | Methacrylic acid | Methacrylic acid | Methacrylic acid |
| | | Amount (part) | 3 | 3 | 3 | 3 | 3 |
| | Other monomer (a3) copolymerizable therewith | Species | Styrene | Styrene | Styrene | Styrene | Styrene |
| | | Amount (part) | 50 | 50 | 50 | 68 | 50 |
| Water-soluble polymer (B) | Production Example number | | B1 | B2 | B1 | B1 | B3 |
| | Ethylenically unsaturated carboxylic acid monomer (b1) | Species | Methacrylic acid | Methacrylic acid | Methacrylic acid | Methacrylic acid | Methacrylic acid |
| | | Amount (part) | 30 | 30 | 30 | 30 | 30 |
| | (Meth)acrylic acid ester monomer (b2) | Species | | Ethyl acrylate + Butyl acrylate | | | |
| | | Amount (part) | 67.5 | 63 | 67.5 | 67.5 | 67.5 |
| | Sulfonic acid group-containing monomer (b3) | Species | AMPS | AMPS | AMPS | AMPS | Styrenesulfonic acid |
| | | Amount (part) | 2.5 | 7 | 2.5 | 2.5 | 2.5 |
| Water-insoluble polymer (A)/water-soluble polymer (B) | | | 90/10 | 90/10 | 85/15 | 90/10 | 90/10 |
| Amount of water-insoluble polymer (A) relative to 100 parts by weight of electrode active material (part) | | | 0.9 | 0.9 | 0.85 | 0.9 | 0.9 |
| Amount of water-soluble polymer (B) relative to 100 parts by weight of electrode active material (part) | | | 0.1 | 0.1 | 0.15 | 0.1 | 0.1 |
| Viscosity of water-soluble polymer (B) prepared as 1 wt % aqueous solution (mPa·s) | | | 3000 | 1200 | 3000 | 3000 | 8400 |
| Weight average molecular weight of water-soluble polymer (B) | | | 25000 | 10000 | 25000 | 25000 | 70000 |
| Length T of electrode when electrode active material layer was cracked in flexibility test (mm) | | | 2 | 2 | 2 | 4 | 5 |
| Peel strength (N/m) | | | 20 | 15 | 15 | 15 | 8 |
| Battery property: high-temperature storage property | | | 90% | 90% | 90% | 85% | 80% |
| Battery property: low-temperature output property | | | 0.15 V | 0.15 V | 0.15 V | 0.25 V | 0.4 V |

TABLE 2

[results of Examples 6 to 10]

|  |  |  | Ex. 6 | Ex. 7 | Ex. 8 | Ex. 9 | Ex. 10 |
|---|---|---|---|---|---|---|---|
| Water-insoluble polymer (A) | Production Example number | | A1 | A1 | A1 | A3 | A4 |
| | Aliphatic conjugated diene monomer (a1) | Species | 1,3-butadiene | 1,3-butadiene | 1,3-butadiene | 1,3-butadiene | 1,3-butadiene |
| | | Amount (part) | 47 | 47 | 47 | 40 | 47 |
| | Ethylenically unsaturated carboxylic acid monomer (a2) | Species | Methacrylic acid | Methacrylic acid | Methacrylic acid | Methacrylic acid | Itaconic acid |
| | | Amount (part) | 3 | 3 | 3 | 3 | 3 |
| | Other monomer (a3) copolymerizable therewith | Species | Styrene | Styrene | Styrene | Styrene | Styrene |
| | | Amount (part) | 50 | 50 | 50 | 57 | 50 |

TABLE 2-continued

[results of Examples 6 to 10]

| | | | Ex. 6 | Ex. 7 | Ex. 8 | Ex. 9 | Ex. 10 |
|---|---|---|---|---|---|---|---|
| Water-soluble polymer (B) | Production Example number | | B4 | B5 | B6 | B1 | B1 |
| | Ethylenically unsaturated carboxylic acid monomer (b1) | Species | Methacrylic acid | Methacrylic acid | Methacrylic acid | Methacrylic acid | Methacrylic acid |
| | | Amount (part) | 30 | 30 | 30 | 30 | 30 |
| | (Meth)acrylic acid ester monomer (b2) | Species | Ethyl acrylate + Butyl acrylate | | | | |
| | | Amount (part) | 63 | 67.5 | 63 | 67.5 | 67.5 |
| | Sulfonic acid group-containing monomer (b3) | Species | Styrenesulfonic acid | 4-sulfobutyl methacrylate | 4-sulfobutyl methacrylate | AMPS | AMPS |
| | | Amount (part) | 7 | 2.5 | 7 | 2.5 | 2.5 |
| Water-insoluble polymer (A)/water-soluble polymer (B) | | | 90/10 | 90/10 | 90/10 | 90/10 | 90/10 |
| Amount of water-insolubule polymer (A) relative to 100 parts by weight of electrode active material (part) | | | 0.9 | 0.9 | 0.9 | 0.9 | 0.9 |
| Amount of water-soluble polymer (B) relative to 100 parts by weight of electrode active material (part) | | | 0.1 | 0.1 | 0.1 | 0.1 | 0.1 |
| Viscosity of water-soluble polymer (B) prepared as 1 wt % aqueous solution (mPa·s) | | | 6000 | 1200 | 700 | 3000 | 3000 |
| Weight average molecular weight of water-soluble polymer (B) | | | 50000 | 10000 | 6000 | 25000 | 25000 |
| Length T of electrode when electrode active material layer was cracked in flexibility test (mm) | | | 6 | 5 | 6 | 3 | 4 |
| Peel strength (N/m) | | | 4 | 7 | 3 | 20 | 10 |
| Battery property: high-temperature storage property | | | 70% | 75% | 65% | 90% | 80% |
| Battery property: low-temperature output property | | | 0.6 V | 0.4 V | 0.6 V | 0.15 V | 0.3 V |

TABLE 3

[results of Examples 11 to 15]

| | | | Ex. 11 | Ex. 12 | Ex. 13 | Ex. 14 | Ex. 15 |
|---|---|---|---|---|---|---|---|
| Water-insoluble polymer (A) | Production Example number | | A5 | A6 | A7 | A1 | A1 |
| | Aliphatic conjugated diene monomer (a1) | Species | 1,3-butadiene | 1,3-butadiene | 1,3-butadiene | 1,3-butadiene | 1,3-butadiene |
| | | Amount (part) | 47 | 47 | 57 | 47 | 47 |
| | Ethylenically unsaturated carboxylic acid monomer (a2) | Species | Acrylic acid | Methacrylic acid | Methacrylic acid | Methacrylic acid | Methacrylic acid |
| | | Amount (part) | 3 | 6 | 3 | 3 | 3 |
| | Other monomer (a3) copolymerizable therewith | Species | Styrene | Styrene | Styrene | Styrene | Styrene |
| | | Amount (part) | 50 | 47 | 40 | 50 | 50 |
| Water-soluble polymer (B) | Production Example number | | B1 | B1 | B1 | B7 | B1 |
| | Ethylenically unsaturated carboxylic acid monomer (b1) | Species | Methacrylic acid | Methacrylic acid | Methacrylic acid | Acrylic acid | Methacrylic acid |
| | | Amount (part) | 30 | 30 | 30 | 30 | 30 |
| | (Meth)acrylic acid ester monomer (b2) | Species | Ethyl acrylate + Butyl acrylate | | | | |
| | | Amount (part) | 67.5 | 67.5 | 67.5 | 67.5 | 67.5 |
| | Sulfonic acid group-containing monomer (b3) | Species | AMPS | AMPS | AMPS | AMPS | AMPS |
| | | Amount (part) | 2.5 | 2.5 | 2.5 | 2.5 | 2.5 |

TABLE 3-continued

[results of Examples 11 to 15]

|  | Ex. 11 | Ex. 12 | Ex. 13 | Ex. 14 | Ex. 15 |
|---|---|---|---|---|---|
| Water-insoluble polymer (A)/water-soluble polymer (B) | 90/10 | 90/10 | 90/10 | 90/10 | 93/7 |
| Amount of water-insolubule polymer (A) relative to 100 parts by weight of electrode active material (part) | 0.9 | 0.9 | 0.9 | 0.9 | 0.93 |
| Amount of water-soluble polymer (B) relative to 100 parts by weight of electrode active material (part) | 0.1 | 0.1 | 0.1 | 0.1 | 0.07 |
| Viscosity of water-soluble polymer (B) prepared as 1 wt % aqueous solution (mPa·s) | 3000 | 3000 | 3000 | 3000 | 3000 |
| Weight average molecular weight of water-soluble polymer (B) | 25000 | 25000 | 25000 | 25000 | 25000 |
| Length T of electrode when electrode active material layer was cracked in flexibility test (mm) | 4 | 3 | 3 | 4 | 3 |
| Peel strength (N/m) | 10 | 12 | 15 | 10 | 18 |
| Battery property: high-temperature storage property | 80% | 80% | 80% | 80% | 85% |
| Battery property: low-temperature output property | 0.3 V | 0.4 V | 0.4 V | 0.4 V | 0.3 V |

TABLE 4

[results of Examples 16 to 20]

|  |  |  | Ex. 16 | Ex. 17 | Ex. 18 | Ex. 19 | Ex. 20 |
|---|---|---|---|---|---|---|---|
| Water-insoluble polymer (A) | Production Example number | | A1 | A8 | A1 | A9 | A1 |
| | Aliphatic conjugated diene monomer (a1) | Species | 1,3-butadiene | 1,3-butadiene | 1,3-butadiene | 1,3-butadiene | 1,3-butadiene |
| | | Amount (part) | 47 | 47.5 | 47 | 24 | 47 |
| | Ethylenically unsaturated carboxylic acid monomer (a2) | Species | Methacrylic acid | Methacrylic acid | Methacrylic acid | Methacrylic acid | Methacrylic acid |
| | | Amount (part) | 3 | 2 | 3 | 3 | 3 |
| | Other monomer (a3) copolymerizable therewith | Species | Styrene | Styrene | Styrene | Styrene | Styrene |
| | | Amount (part) | 50 | 50.5 | 50 | 73 | 50 |
| Water-soluble polymer (B) | Production Example number | | B1 | B1 | B1 | B1 | B8 |
| | Ethylenically unsaturated carboxylic acid monomer (b1) | Species | Methacrylic acid | Methacrylic acid | Methacrylic acid | Methacrylic acid | Methacrylic acid |
| | | Amount (part) | 30 | 30 | 30 | 30 | 60 |
| | (Meth)acrylic acid ester monomer (b2) | Species | | Ethyl acrylate + Butyl acrylate | | | |
| | | Amount (part) | 67.5 | 67.5 | 67.5 | 67.5 | 30 |
| | Sulfonic acid group-containing monomer (b3) | Species | AMPS | AMPS | AMPS | AMPS | AMPS |
| | | Amount (part) | 2.5 | 2.5 | 2.5 | 2.5 | 10 |
| Water-insoluble polymer (A)/water-soluble polymer (B) | | | 85/15 | 90/10 | 80/20 | 90/10 | 90/10 |
| Amount of water-insolubule polymer (A) relative to 100 parts by weight of electrode active material (part) | | | 2.83 | 0.9 | 4 | 0.9 | 0.9 |
| Amount of water-soluble polymer (B) relative to 100 parts by weight of electrode active material (part) | | | 0.5 | 0.1 | 1 | 0.1 | 0.1 |
| Viscosity of water-soluble polymer (B) prepared as 1 wt % aqueous solution (mPa·s) | | | 3000 | 3000 | 3000 | 3000 | 350 |
| Weight average molecular weight of water-soluble polymer (B) | | | 25000 | 25000 | 25000 | 25000 | 3000 |

TABLE 4-continued

[results of Examples 16 to 20]

|  | Ex. 16 | Ex. 17 | Ex. 18 | Ex. 19 | Ex. 20 |
|---|---|---|---|---|---|
| Length T of electrode when electrode active material layer was cracked in flexibility test (mm) | 4 | 4 | 5 | 7 | 5 |
| Peel strength (N/m) | 20 | 12 | 20 | 20 | 12 |
| Battery property: high-temperature storage property | 80% | 75% | 75% | 70% | 70% |
| Battery property: low-temperature output property | 0.4 V | 0.4 V | 0.4 V | 0.5 V | 0.5 V |

TABLE 5

[results of Example 21 and Comparative Examples 1 to 4]

| | | | Ex. 21 | Comp. Ex. 1 | Comp. Ex. 2 | Comp. Ex. 3 | Comp. Ex. 4 |
|---|---|---|---|---|---|---|---|
| Water-insoluble polymer (A) | Production Example number | | A1 | A1 | A1 | A1 | A1 |
| | Aliphatic conjugated diene monomer (a1) | Species | 1,3-butadiene | 1,3-butadiene | 1,3-butadiene | 1,3-butadiene | 1,3-butadiene |
| | | Amount (part) | 47 | 47 | 47 | 47 | 47 |
| | Ethylenically unsaturated carboxylic acid monomer (a2) | Species | Methacrylic acid | Methacrylic acid | Methacrylic acid | Methacrylic acid | Methacrylic acid |
| | | Amount (part) | 3 | 3 | 3 | 3 | 3 |
| | Other monomer (a3) copolymerizable therewith | Species | Styrene | Styrene | Styrene | Styrene | Styrene |
| | | Amount (part) | 50 | 50 | 50 | 50 | 50 |
| Water-soluble polymer (B) | Production Example number | | B1 | B1 | B9 | B10 | B11 |
| | Ethylenically unsaturated carboxylic acid monomer (b1) | Species | Methacrylic acid | Methacrylic acid | Methacrylic acid | Methacrylic acid | Methacrylic acid |
| | | Amount (part) | 30 | 30 | 64 | 30 | 18 |
| | (Meth)acrylic acid ester monomer (b2) | Species | Ethyl acrylate + Butyl acrylate | | | | |
| | | Amount (part) | 67.5 | 67.5 | 35 | 53 | 79.5 |
| | Sulfonic acid group-containing monomer (b3) | Species | AMPS | AMPS | AMPS | AMPS | AMPS |
| | | Amount (part) | 2.5 | 2.5 | 1 | 17 | 2.5 |
| Water-insoluble polymer (A)/water-soluble polymer (B) | | | 90/10 | 97/3 | 90/10 | 90/10 | 90/10 |
| Amount of water-insolubule polymer (A) relative to 100 parts by weight of electrode active material (part) | | | 0.72 | 0.97 | 0.9 | 0.9 | 0.9 |
| Amount of water-soluble polymer (B) relative to 100 parts by weight of electrode active material (part) | | | 0.08 | 0.03 | 0.1 | 0.1 | 0.1 |
| Viscosity of water-soluble polymer (B) prepared as 1 wt % aqueous solution (mPa · s) | | | 3000 | 3000 | 6000 | 12000 | 3800 |
| Weight average molecular weight of water-soluble polymer (B) | | | 25000 | 25000 | 50000 | 100000 | 20000 |
| Length T of electrode when electrode active material layer was cracked in flexibility test (mm) | | | 5 | 5 | 7 | 5 | 7 |
| Peel strength (N/m) | | | 8 | 5 | 3 | 2 | 3 |
| Battery property: high-temperature storage property | | | 70% | 70% | 60% | 60% | 60% |
| Battery property: low-temperature output property | | | 0.55 V | 0.5 V | 0.5 V | 0.6 V | 0.7 V |

[Discussion]

As can be seen from Tables 1 to 5, in Examples, the flexibility and adhesion strength of the negative electrode, and the high-temperature storage property and low-temperature output property of the secondary battery are all excellent. In contrast thereto, in Comparative Examples, any of performance of the flexibility and adhesion strength of the negative electrode and the high-temperature storage property and low-temperature output property of the secondary battery is not sufficient. As confirmed from the results of Examples and Comparative Examples, the combination of the negative electrode active material, the water-insoluble polymer (A), and the water-soluble polymer (B) having a sulfonic acid group at a specific ratio is essential for realizing improvement of all of the flexibility and adhesion strength of the negative electrode and the high-temperature storage property and low-temperature output property of the secondary battery.

DESCRIPTION OF NUMERALS

10: Sample
T: Length of the electrode in the folded part of sample 10

The invention claimed is:

1. A slurry for a negative electrode of a secondary battery, comprising an electrode active material, a water-insoluble polymer (A), and a water-soluble polymer (B), wherein:
   the water-insoluble polymer (A) contains 20 wt % to 60 wt % of an aliphatic conjugated diene monomer unit (a1), 0.5 wt % to 10 wt % of an ethylenically unsaturated carboxylic acid monomer unit (a2), and 30 wt % to 79.5 wt % of a unit (a3) of a monomer that is copolymerizable with the aliphatic conjugated diene monomer and the ethylenically unsaturated carboxylic acid monomer,
   the water-soluble polymer (B) contains 20 wt % to 60 wt % of an ethylenically unsaturated carboxylic acid monomer unit (b1), 25 wt % to 78 wt % of a (meth)acrylic acid ester monomer unit (b2), and 2 wt % to 15 wt % of a unit (b3) of a sulfonic acid group-containing monomer that is copolymerizable with the ethylenically unsaturated carboxylic acid monomer and the (meth)acrylic acid ester monomer, and
   a ratio (A)/(B) in parts by weight of the water-insoluble polymer (A) relative to the water-soluble polymer (B) is 80/20 to 95/5.

2. The slurry for a negative electrode of a secondary battery according to claim 1, wherein the (b3) component of the water-soluble polymer (B) is a repeating unit obtained by polymerization of one or more of sulfonic acid group-containing monomers selected from the group consisting of a sulfonic acid group-containing monomer or a salt thereof having no functional group other than a sulfonic acid group, a monomer containing an amido group and a sulfonic acid group or a salt thereof, and a monomer containing a hydroxyl group and a sulfonic acid group or a salt thereof.

3. The slurry for a negative electrode of a secondary battery according to claim 1, wherein an amount of the water-insoluble polymer (A) is 0.3 parts by weight to 8 parts by weight relative to 100 parts by weight of the electrode active material.

4. The slurry for a negative electrode of a secondary battery according to claim 1, wherein an amount of the water-soluble polymer (B) is 0.01 parts by weight to 5 parts by weight relative to 100 parts by weight of the electrode active material.

5. The slurry for a negative electrode of a secondary battery according to claim 1, wherein the water-soluble polymer (B) has a weight average molecular weight of 1,000 to 100,000.

6. A method for producing a negative electrode for a secondary battery, comprising applying the slurry for a negative electrode of a secondary battery according to claim 1 onto a surface of a collector, and drying the slurry.

7. A negative electrode for a secondary battery, comprising a collector and an electrode active material layer formed on a surface of the collector, wherein:
   the electrode active material layer contains an electrode active material, a water-insoluble polymer (A), and a water-soluble polymer (B),
   the water-insoluble polymer (A) contains 20 wt % to 60 wt % of an aliphatic conjugated diene monomer unit (a1), 0.5 wt % to 10 wt % of an ethylenically unsaturated carboxylic acid monomer unit (a2), and 30 wt % to 79.5 wt % of a unit (a3) of a monomer that is copolymerizable with the aliphatic conjugated diene monomer and the ethylenically unsaturated carboxylic acid monomer,
   the water-soluble polymer (B) contains 20 wt % to 60 wt % of an ethylenically unsaturated carboxylic acid monomer unit (b1), 25 wt % to 78 wt % of a (meth)acrylic acid ester monomer unit (b2), and 2 wt % to 15 wt % of a unit (b3) of a sulfonic acid group-containing monomer that is copolymerizable with the ethylenically unsaturated carboxylic acid monomer and the (meth)acrylic acid ester monomer, and
   a ratio (A)/(B) in parts by weight of the water-insoluble polymer (A) relative to the water-soluble polymer (B) is 80/20 to 95/5.

8. A secondary battery comprising the negative electrode for a secondary battery according to claim 7.

* * * * *